US007254531B2

(12) United States Patent
Nir

(10) Patent No.: US 7,254,531 B2
(45) Date of Patent: Aug. 7, 2007

(54) IN-CONTEXT ANALYSIS AND AUTOMATIC TRANSLATION

(76) Inventor: Einat H. Nir, 20 Komemiut St., 48039 Rosh Ha'ayin (IL)

( * ) Notice: Subject to any disclaimer, the term of this patent is extended or adjusted under 35 U.S.C. 154(b) by 684 days.

(21) Appl. No.: 10/750,907

(22) Filed: Jan. 5, 2004

(65) Prior Publication Data

US 2004/0138872 A1   Jul. 15, 2004

Related U.S. Application Data

(63) Continuation-in-part of application No. 09/946,391, filed on Sep. 6, 2001, now Pat. No. 6,704,699.

(60) Provisional application No. 60/229,794, filed on Sep. 5, 2000.

(51) Int. Cl.
   *G06F 17/20* (2006.01)
(52) U.S. Cl. .......................... 704/10; 382/313
(58) Field of Classification Search .............. 704/10; 382/313
   See application file for complete search history.

(56) References Cited

U.S. PATENT DOCUMENTS 5,680,511 A * 10/1997 Baker et al. ............... 704/257

| | | |
|---|---|---|
| 6,446,081 B1 | 9/2002 | Preston |
| 6,519,631 B1 | 2/2003 | Rosenchein et al. |
| 6,609,091 B1 | 8/2003 | Budzinski |
| 6,651,220 B1 | 11/2003 | Penteroudakis et al. |
| 6,704,699 B2 * | 3/2004 | Nir ........................ 704/2 |

* cited by examiner

*Primary Examiner*—Susan McFadden

(57) ABSTRACT

Methods are described for automatically presenting at least one definition in context, for a dictionary entry, based a contextual analysis of the grammatical unit, such as the sentence, the clause, or the phrase, in which the dictionary entry is embedded. The dictionary entry may be single word, for example, "consideration," or a word combination, such as "due to," provided the word combination appears in an ordinary dictionary as a single entry. A definition in context will generally include a definition in accordance with the function of the word in the grammatical unit, and may further include a preferred definition from among several options for the same function, based on contextual clues within the grammatical unit. Similarly, a translation in context may be presented. The present invention further relates to a method of preparing automatic-translation viable documents, in a first language, adapted for accurate automatic translation, to a plurality of languages. Additionally, interactive automatic translation software is taught, for use in tandem with a human translator. These may be performed by a supercomputer, a personal computer, a laptop, a palmtop, a stand-alone hand-held, computerized scanning apparatus, or over the web.

9 Claims, 42 Drawing Sheets

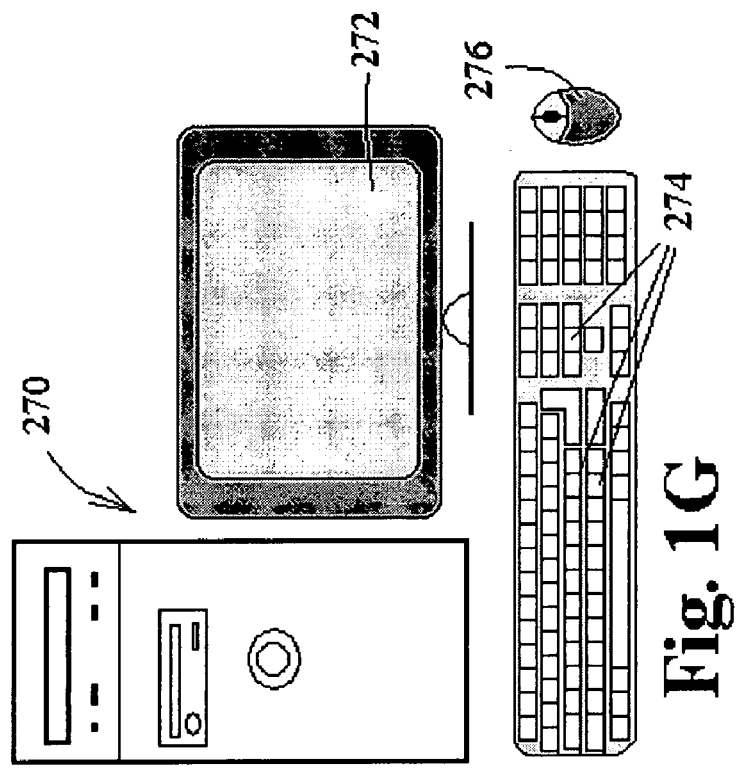
Fig. 1G
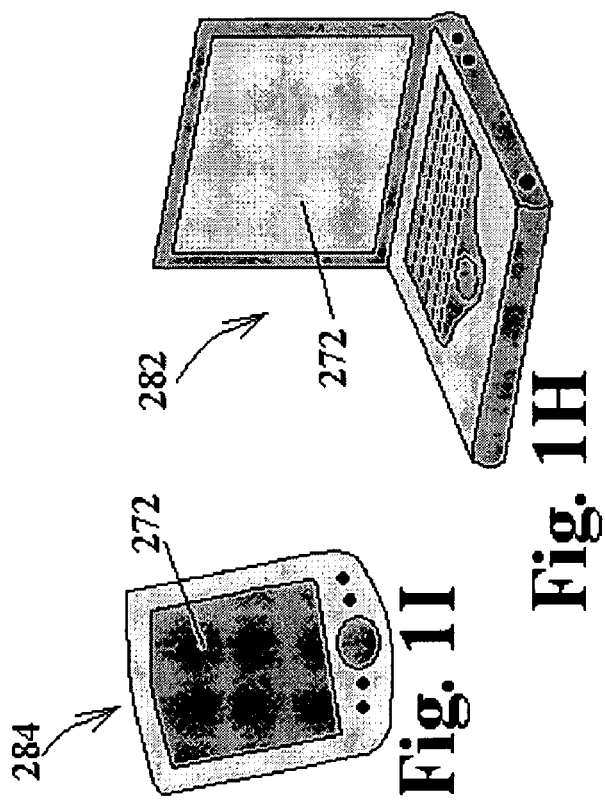
Fig. 1H
Fig. 1I

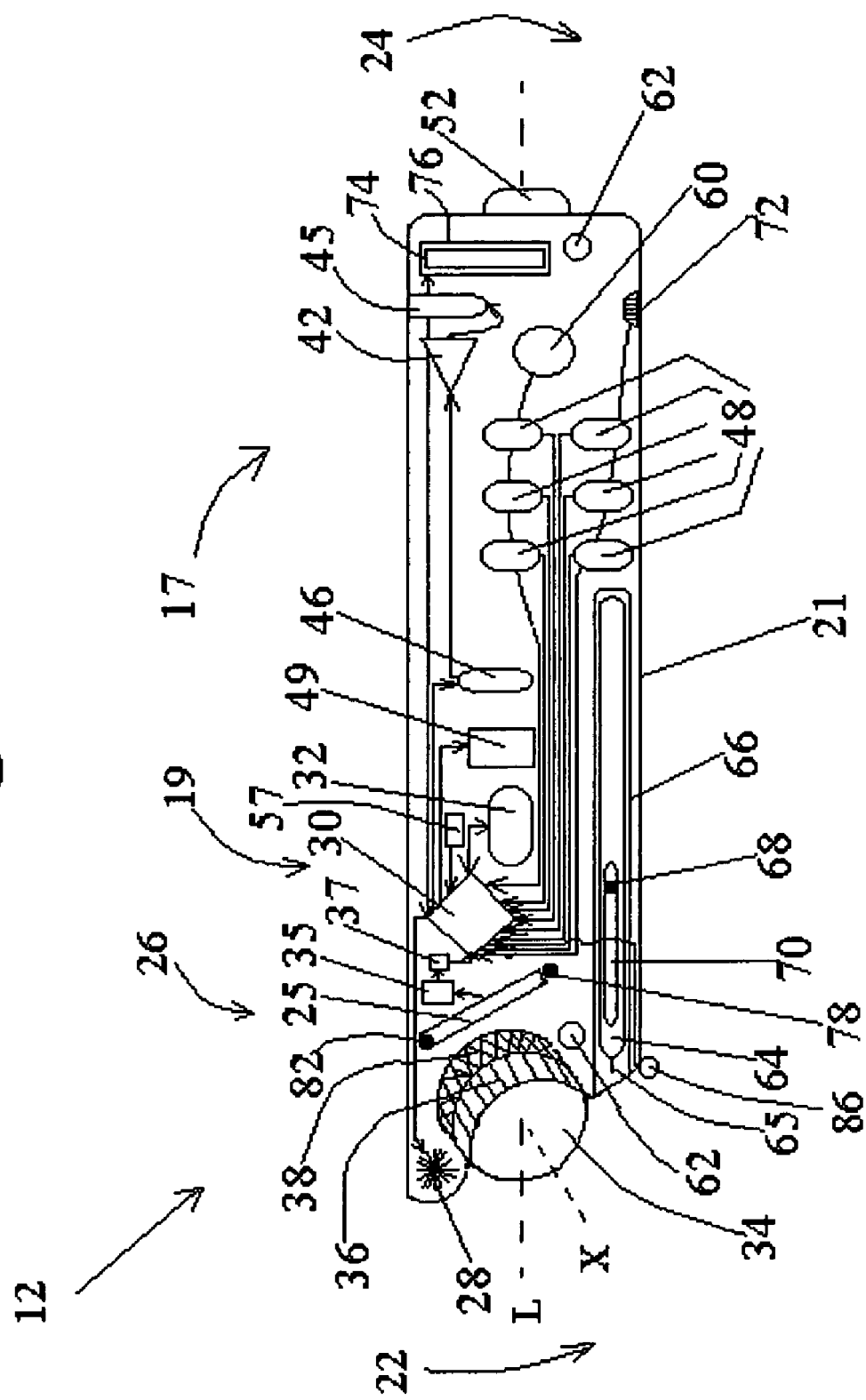

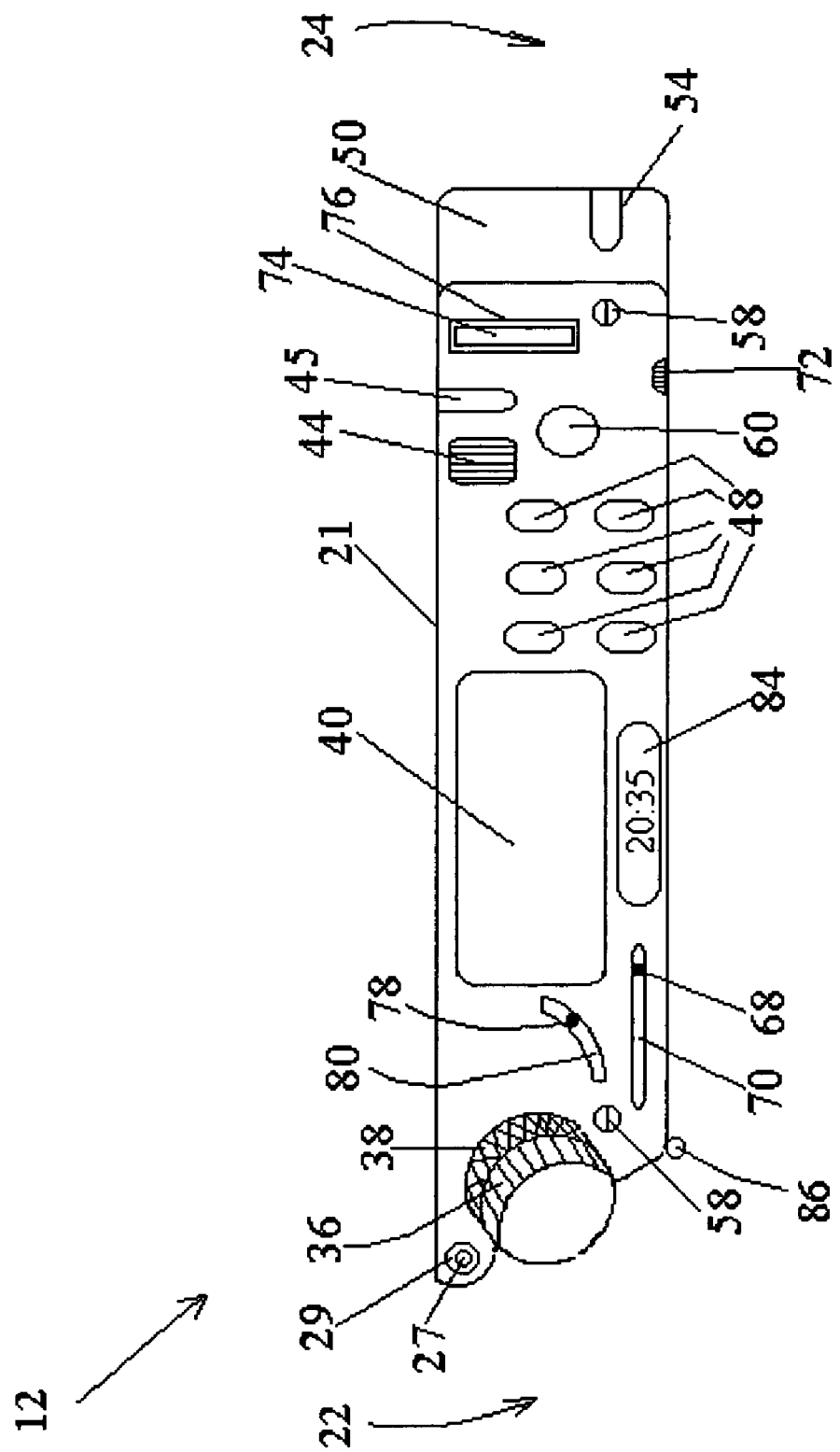

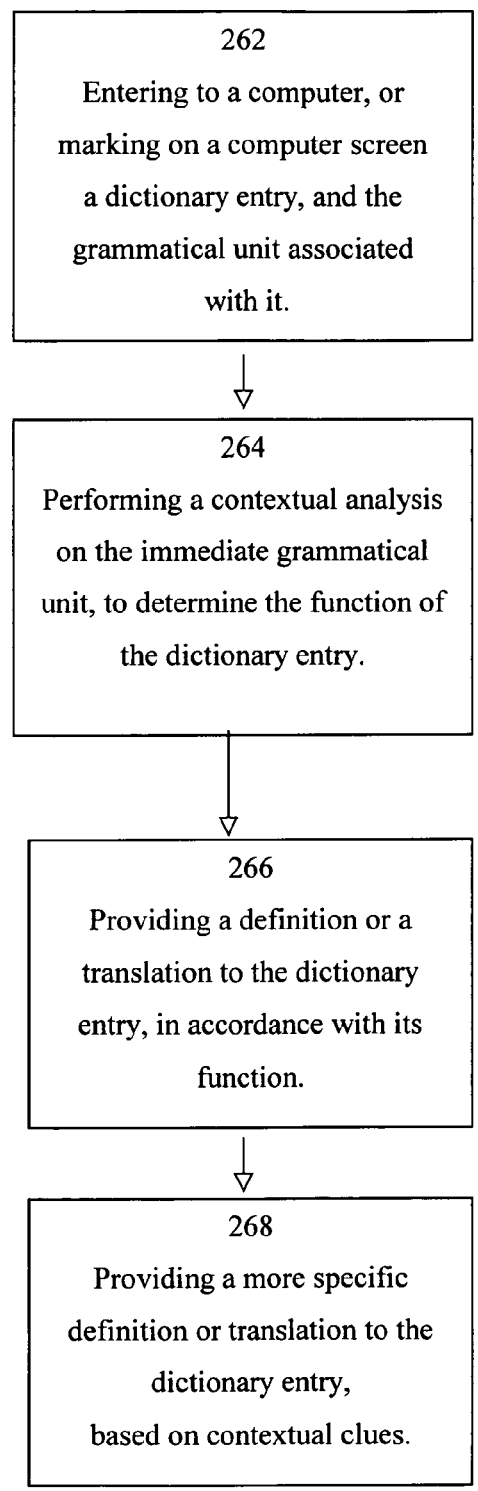

262
Entering to a computer, or marking on a computer screen a dictionary entry, and the grammatical unit associated with it.

264
Performing a contextual analysis on the immediate grammatical unit, to determine the function of the dictionary entry.

266
Providing a definition or a translation to the dictionary entry, in accordance with its function.

268
Providing a more specific definition or translation to the dictionary entry, based on contextual clues.

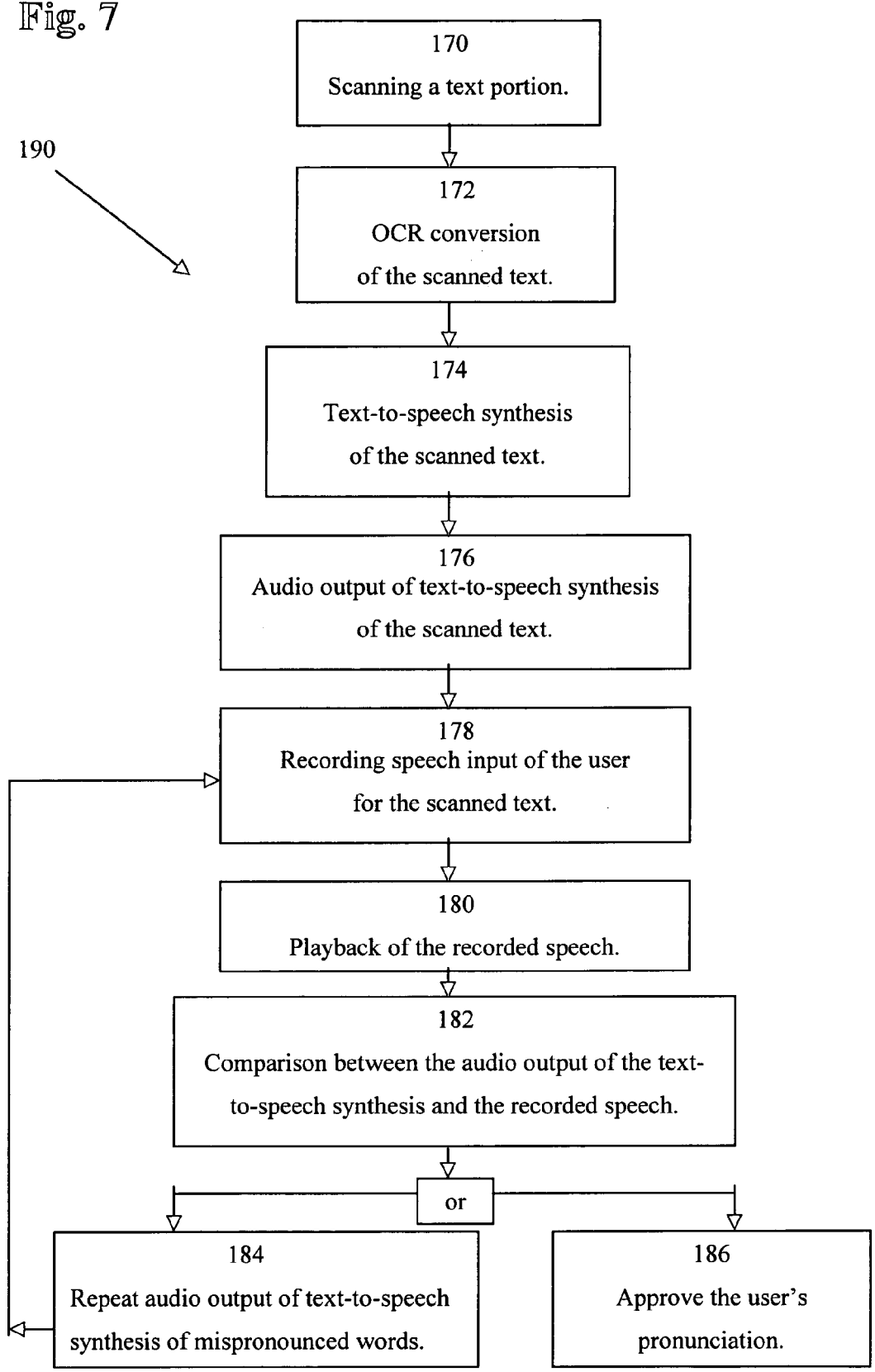

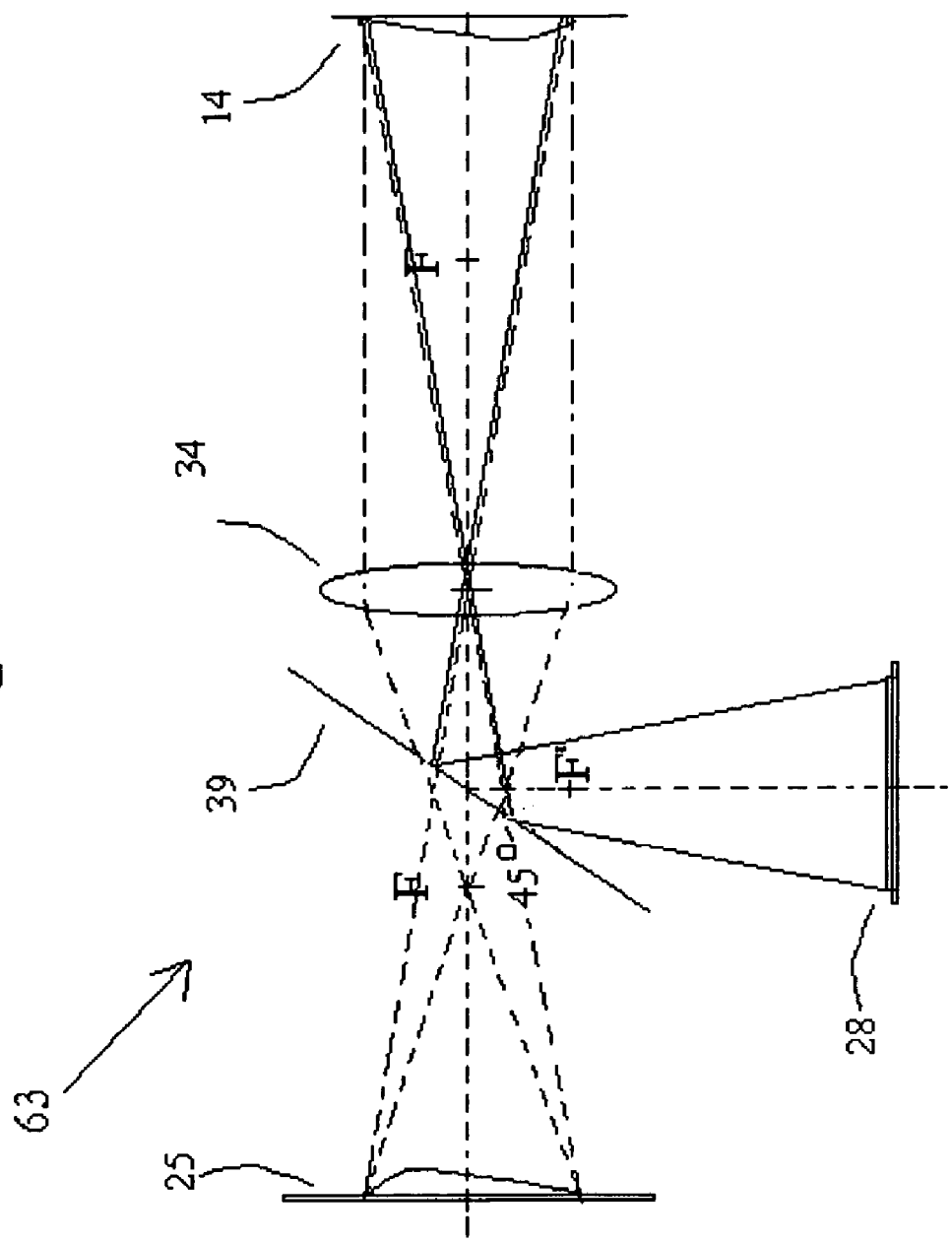

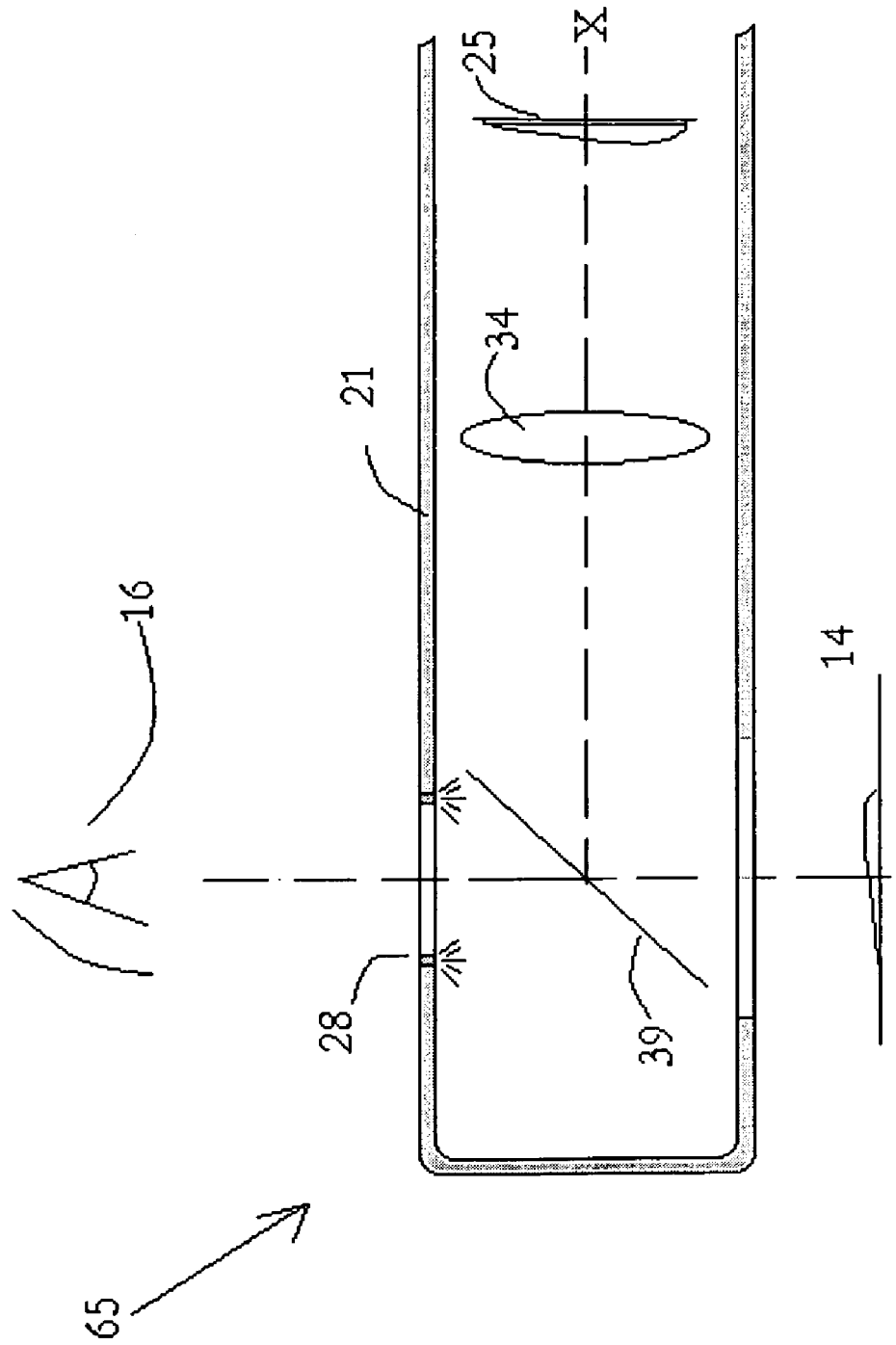

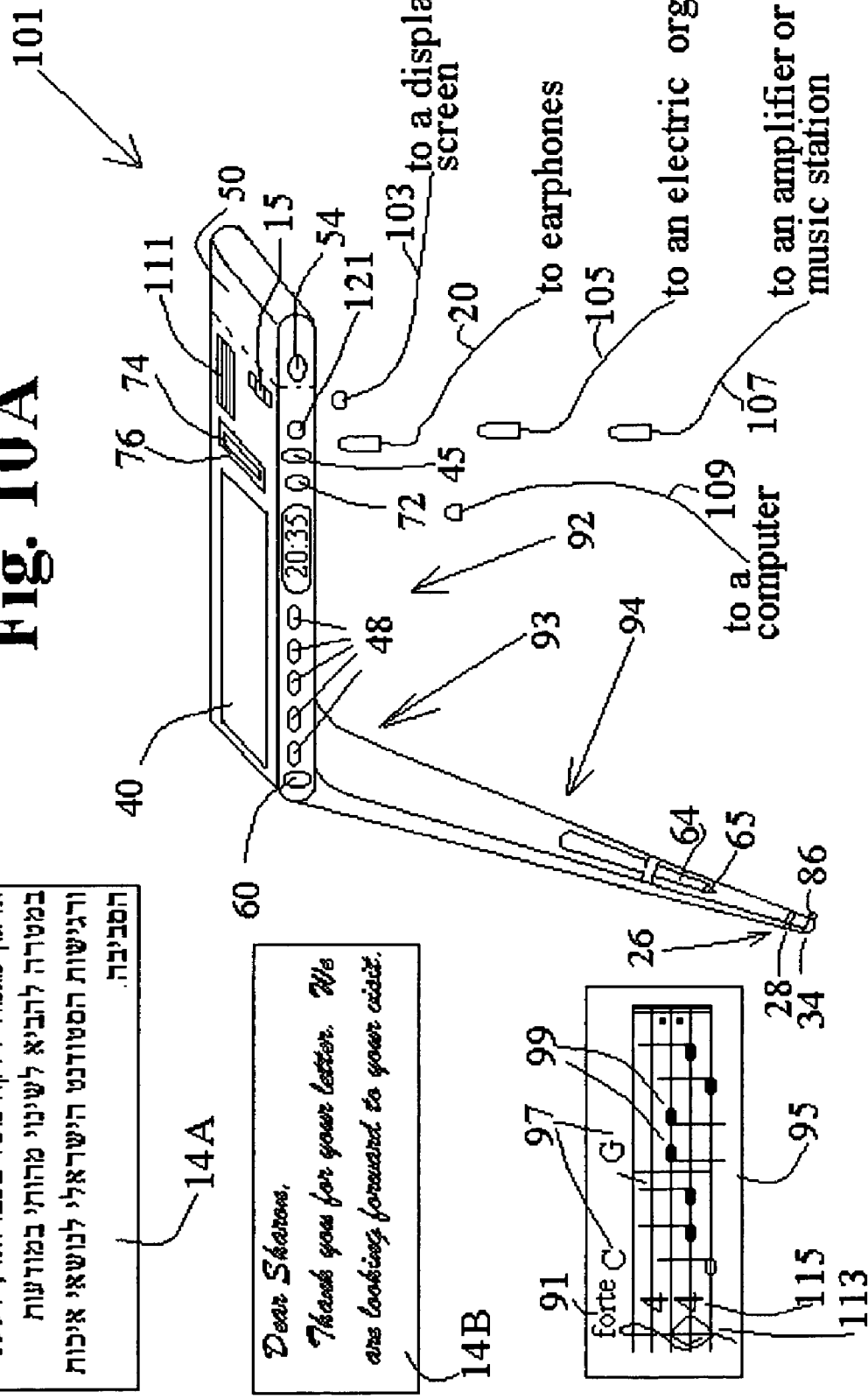

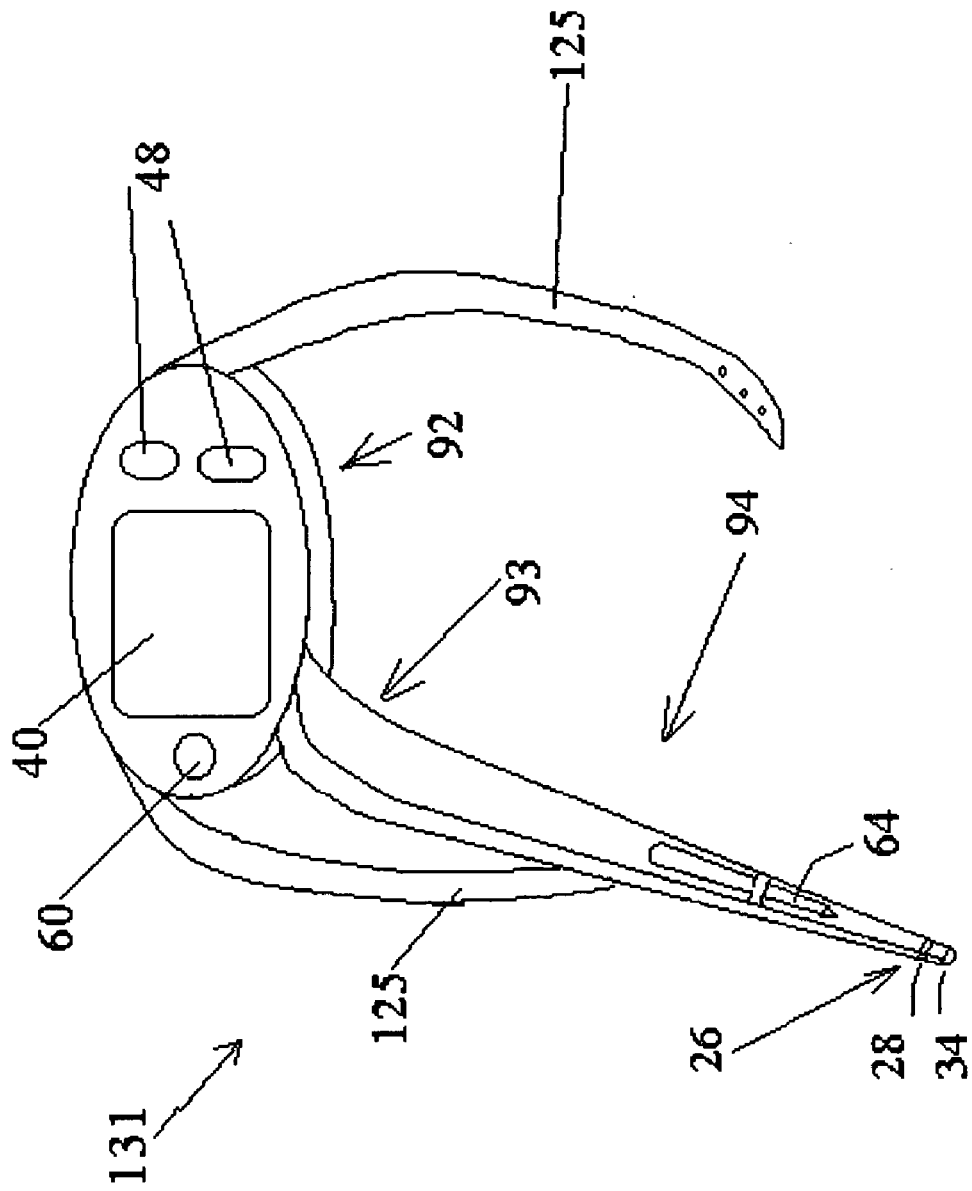

Fig. 12A

| grammatical unit | 340 The local ski resort was opened to visitors on Saturday morning, | | | | |
|---|---|---|---|---|---|
| major functional component | 342 The local ski resort | 344 was opened | 346 to | 348 visitors | 350 on Saturday morning |
| major component's function | 352 Subject: noun phrase | 354 Predicate: verb phrase | 356 preposition | 358 object: noun tangible, human plural | 360 adverbial phrase |

Fig. 12B

| major functional component | 342 The local ski resort | | | |
|---|---|---|---|---|
| basic functional component of dictionary-entry level | 362 The | 364 local | 366 ski | 368 resort |
| basic component's function | 372 article | 374 adjective 1 | 376 adjective 2 | 378 noun |
| basic component's attribute | 382 definite | 384 adjective form | 386 attributive noun form | 388 tangible, inanimate, singular |

Fig. 12C

| 390 General Adverbial-Phrase Template  Preposition – Article - Adjective phrase(s) - Noun - Prepositional Phrase ||||||
|---|---|---|---|---|
| Preposition | Article | Adjective Phrase(s) | Noun | Prepositional Phrase |
| By the river |||||
| By | the | - | river | - |
| After dinner |||||
| After | - | - | dinner | - |
| By his wisdom |||||
| By | - | his | wisdom | - |
| With some luck |||||
| With |  | some | luck |  |
| In a minute |||||
| In | a | - | minute | - |
| With a piercingly loud and screeching scream |||||
| With | a | piercingly loud and screeching | scream |  |
| By the rivers of Babylon |||||
| By | the | - | rivers | of Babylon |
| In consequence of my smoking |||||
| In consequence of |  |  | my | smoking |

Fig. 12D

| \multicolumn{5}{c}{392 General Imperative-Sentence Template  Imperative verb –Preposition – Article - Adjective phrase(s) - Noun phrase} |
|---|---|---|---|---|
| *Imperative Verb* | *Preposition* | *Article* | *Adjective Phrase(s)* | *Noun Phrase* |
| Fast forward a decade. | | | | |
| Fast forward | - | a | - | decade |
| Return to sender. | | | | |
| Return | to | | | sender |
| Write down your great ideas about your book. | | | | |
| Write | down | - | your great | ideas about your book |
| Bring in your friend. | | | | |
| Bring | in | - | your | friend |
| Go! | | | | |
| Go | | | | |

Fig. 13A

| Function | Attributes, 1st Level | Attributes, 2nd Level | Attributes, 3rd Level | Attributes, 4th Level |
|---|---|---|---|---|
| article | | | | |
| | indefinite | | | |
| | definite | | | |
| | | | | |
| noun | | | | |
| | intangible | | | |
| | | abstract | | |
| | | | singular | |
| | | | plural | |
| | | action | | |
| | | | active | |
| | | | | infinitive |
| | | | | gerund |
| | | | passive | |
| | | | | participle |
| | | | | |
| | tangible | | | |
| | | singular | | |
| | | plural | | |
| | | | male | |
| | | | female | |
| | | | | human |
| | | | | animal |
| | | | | vegetable |
| | | | | object |
| | | | | time |

Fig. 13B

| Function | Attributes, 1st Level | Attributes, 2nd Level | Attributes, 3rd Level | Attributes, 4th Level |
|---|---|---|---|---|
| noun (continued) | | | | |
| | pronoun | | | |
| | | I | | |
| | | you | | |
| | | he | | |
| | | she | | |
| | | it | | |
| | | we | | |
| | | they | | |
| | | me | | |
| | | you | | |
| | | him | | |
| | | her | | |
| | | us | | |
| | | them | | |
| | | myself | | |
| | | yourself | | |
| | | himself | | |
| | | herself | | |
| | | itself | | |
| | | ourselves | | |
| | | yourselves | | |
| | | themselves | | |
| | | mine | | |
| | | yours | | |
| | | his | | |
| | | hers | | |
| | | ours | | |
| | | yours | | |
| | | theirs | | |
| | | this | | |
| | | that | | |
| | | those | | |
| | | these | | |
| | | who | | |
| | | what | | |
| | | which | | |
| | | whose | | |

Fig. 13C

| Function | Attributes, 1st Level | Attributes, 2nd Level | Attributes, 3rd Level | Attributes, 4th Level |
|---|---|---|---|---|
| adjective | | | | |
| | adjective form | | | |
| | attributive noun form | | | |
| | gerund | | | |
| | participle | | | |
| | possessor | | | |
| adverb | | | | |
| | adverbial form | | | |
| | question words | | | |
| | | what | | |
| | | where | | |
| | | when | | |
| | | why | | |
| | | who | | |
| | | whose | | |
| | | whom | | |
| | | how | | |
| | | how come | | |
| | | which | | |
| | | | | |
| preposition | in | | | |
| | out | | | |
| | over | | | |
| | under | | | |
| | from | | | |
| | to | | | |
| | at | | | |
| | with | | | |
| | about | | | |
| | after | | | |
| | down | | | |
| | up | | | |
| | into | | | |
| | for | | | |
| | since | | | |
| | but | | | |

Fig. 13D

| Function | Attributes, 1st Level | Attributes, 2nd Level | Attributes, 3rd Level | Attributes, 4th Level |
|---|---|---|---|---|
| verb | | | | |
| | intransitive | | | |
| | transitive | | | |
| | | passive | | |
| | | active | | |
| | | imperative | | |
| | | | present simple | |
| | | | present cont. | |
| | | | present perfect | |
| | | | past simple | |
| | | | past cont. | |
| | | | past perfect | |
| | | | future simple | |
| | | | future cont. | |
| | | | future going to | |
| | | | modal | may |
| | | | | can |
| | | | | could |
| | | | | could have |
| | | | | would |
| | | | | would have |
| | | | | should |
| | | | | should have |
| | | | | might |
| | | | | might have |
| | | | | ought to |
| | | | | ought to have |
| | | | | will have |
| | | | | shall have |

Fig. 13E

| Function | Attributes, 1st Level | Attributes, 2nd Level | Attributes, 3rd Level | Attributes, 4th Level |
|---|---|---|---|---|
| conjunction | | | | |
| | however | | | |
| | whatever | | | |
| | wherever | | | |
| | whenever | | | |
| | wherein | | | |
| | whereas | | | |
| | that | | | |
| | after | | | |
| | because | | | |
| | since | | | |
| | why | | | |
| | where | | | |
| | how | | | |
| | when | | | |
| | and | | | |
| | but | | | |

Fig. 14

| 430 Exposure Basis ||
|---|---|
| 440 English | 450 Hebrew |
| The local ski resort was opened to visitors on Saturday morning, after some 70 centimeters of snow piled up in the area, in a snow storm that began Wednesday night. The resort management said that skiing will not be possible yet, because there was not enough snow on the mountain to enable safe skiing. Lower regions witnessed heavy rains and hail. As a result, rivers and streams filled up. The storm is expected to end on Saturday. | אתר התיירות המקומי נפתח למבקרים בשבת בבוקר, אחרי שכ-70 סמ' של שלג נערמו באזור, בעת סופת שלג שהחלה ביום רביעי בערב. הנהלת האתר מסרה כי עדיין לא ניתן לגלוש מאחר ואין מספיק שלג על ההר לאפשר גלישה בטוחה. באזורים הנמוכים יותר ירדו גשמים עזים וברד. כתוצאה מכך, נהרות ונחלים התמלאו. הסופה אמורה לשכוח בשבת. |

Fig. 15A

| | Grammatical Units and Their Corresponding Functional Templates |
|---|---|
| Grammatical Unit, 1st language | 442<br>The local ski resort |
| Functional Template, 1st language | 444<br>definite article, adjective 1 (adjective form),<br>adjective 2 (attributive noun form), noun (tangible, object, singular). |
| Functional Template, 2nd language | 454<br>noun (tangible, object, singular, male),<br>definite article, adjective 2 (possessive form),<br>definite article, adjective 1 (adjective form). |
| Grammatical Unit, 2nd language | 452<br>אתר הסקי המקומי |

Fig. 15B

| Grammatical Units and Their Corresponding Functional Templates ||
|---|---|
| Grammatical Unit, 1st language | 442<br>The local ski resort |
| Functional Template, 1st language | 444<br>definite article, adjective 1 (adjective form),<br>adjective 2 (noun form), noun (tangible, object, singular). |
| Functional Template, 3rd language | 464<br>definite article (female), noun (tangible, object, singular, female), adjective 2 [prepositional phrase (preposition, noun (male form, singular))], adjective 1 (adjective form, female). |
| Grammatical Unit, 3rd language | 462<br>La station de ski locale |

Fig. 15C

| \multicolumn{2}{|c|}{Grammatical Units and Their Corresponding Functional Templates} |

| | |
|---|---|
| Grammatical Unit, 2$^{nd}$ language | 452<br>אתר הסקי המקומי |
| Functional Template, 2$^{nd}$ language | 454<br>noun (tangible, object, singular, male),<br>definite article, adjective 2 (possessive form),<br>definite article, adjective 1 (adjective form). |
| Functional Template, 3$^{rd}$ language | 464<br>definite article (female), noun (tangible, object, singular, female), adjective 2 [prepositional phrase (preposition, noun (male form, singular))], adjective 1 (adjective form, female). |
| Grammatical Unit, 3$^{rd}$ language | 462<br>La station de ski locale |

IN-CONTEXT ANALYSIS AND AUTOMATIC TRANSLATION

CROSS-REFERENCE TO RELATED APPLICATIONS

This is a Continuation-In-Part of U.S. patent application Ser. No. 09/946,391, filed on Sep. 6, 2001, now U.S. Pat. No. 6,704,699 which claims priority from U.S. Provisional Patent Application No. 60/229,794, filed on Sep. 5, 2000.

FIELD OF THE INVENTION

The present invention relates to methods of presenting definitions in context and to methods of automatic translation, by computerized devices in general and by a stand-alone, hand-held, computerized scanning apparatus.

BACKGROUND OF THE INVENTION

As instruments for acquiring a new language, dictionaries are sometimes ineffective. For example, dictionaries generally provide multiple meanings to words, and the meanings often depend on the functions the words play in a particular sentence. In Merriam-Webster OnLine Dictionary (http://www.m-w.com), the word "result" has two entries, as an intransitive verb and as a noun. The word "after" has six entries, as an adverb, a preposition, a conjunction, an adjective, a verbal auxiliary, and a noun. To look up a word, one must first select the appropriate function.

Yet, to a nonnative speaker of a language, determining the function of an unknown word in a specific sentence is not simple, since sentence structures in different languages differ. In English, for example, a sentence generally begins with adjectives to the subject, and some of these may be attributive nouns, operative as adjectives. Additionally, certain words may be used either as nouns or as verbs. In consequence, a list of words may be strung together, wherein each may function in two or more ways, so as to completely baffle a nonnative speaker. Consider for example:

"Stock market rates show improved performance."

Is "market" the subject, and "rates" the predicate? Is "rates" the subject, and "show" the predicate? Or is "show" the subject and "improved" the predicate?

Consider also,

"High health care costs result in poor health care availability."

Is "care" the subject, and "costs" the predicate? Or is "costs" the subject and "result" the predicate?

In fact, in some cases, determining the function of an unknown word in a sentence may be more difficult than inferring the meaning of a word, whose function in the sentence is known.

Native speakers are sensitive to subtle clues that generally make these sentences unequivocal. But nonnative speakers of a particular language may not be sufficiently familiar with or sufficiently tuned to these clues. Yet, it is on this point, crucial to understanding, that dictionaries offer no help.

Additionally, in most English dictionaries, definitions are provided for a word stem, when a verb, but not for its participle and gerund forms, which may function as adjectives. A certain linguistic skill is required for making the transformation to an adjective, a skill not always possessed by a nonnative speaker of English, whose native tongue does not include such transformations. Furthermore, since ordinary English dictionaries generally do not treat the participle and gerund forms as adjectives, they do not explain the distinction between them, when functioning as adjectives.

The use of attributive nouns is another cause for puzzlement. Attributive nouns relate to two or more nouns, juxtaposed, with no connecting words. Is "a science fair" a fair of things scientific, or a science of organizing fairs? Neither the American Heritage® Dictionary of the English Language: Fourth Edition, 2000, http://www.bartleby.com/61/, nor the Merriam-Webster OnLine Dictionary provide an answer.

Even for a specific function, dictionaries often provide a plurality of meanings. For example, the word "order" as a transitive verb, has six meanings, according to the American Heritage® Dictionary. Yet, in a particular context, many of these meanings are irrelevant, and their inclusion makes the use of the dictionary cumbersome, even frustrating.

An instrument, which has the power of a dictionary, but which is specifically adapted for language acquisition, is desired.

SURVEY OF PRIOR ART

Optical scanners are known. They convert objects such as pictures, barcodes, or portions of text to machine-readable data signals. Typically, the data signals are read by a user's computer to reproduce an image of the scanned object on a display device, such as a CRT, a display screen or a printer.

A hand-held optical scanner is manipulated by hand across the object that is being scanned. The hand-held scanner may be connected directly to the user's computer by a data cable, and may transfer image data to the computer as the data are collected. Alternatively, the hand-scanner may be a stand-alone unit and may include a data storage component for storing the image data. The data may be downloaded to a separate computer after the scanning operation is complete.

A hand-held optical scanner generally includes an illumination system, for illuminating the region to be scanned, an optical system, for collecting and focusing light reflected by the illuminated, scanned region, a photosensitive detector, for detecting the light collected and focused thereon by the optical system, an analog amplifier, for amplifying the signals produced by the photosensitive detector, and an analog-to-digital converter, for converting the amplified signals to digitized machine-readable data signals. The illumination system may be, for example, a fluorescent or incandescent lamp or an array of light emitting diodes (LEDs). The optical system may include a lens or a lens-and-mirror assembly.

The photosensitive detector is generally a Charge-Coupled Device (CCD). A CCD includes an array of photosensitive cells, or pixels, each pixel collecting an electrical charge responsive to the light that falls upon it. Thus, a CCD may be used to detect light and dark spots of a scanned object. The charge from each pixel is converted to an analog voltage by an analog amplifier, and the analog voltage is digitized by an Analog-to-Digital Converter (ADC). The digitized signals are the machine-readable data signals, which can be stored or processed by the user on a computer or a similar device.

Sometimes, a Contact Image Sensor (CIS) is used in place of the CCD. In a CIS scanner, the array of photosensitive cells is arranged in close proximity to the object to be scanned, so as to catch the reflected light directly; an optical system is not necessary.

U.S. Pat. No. 5,996,895 to Heiman, et al, incorporated herein by reference, describes a scanning system with adjustable light output and/or scanning angle.

U.S. Pat. No. 6,033,086 to Bohn, incorporated herein by reference, describes a compact illumination system for a hand-held scanner.

U.S. Pat. No. 5,841,121 to Koenck, incorporated herein by reference, describes a hand-held optical scanners, having automatic focus control, for operation over a range of distances.

U.S. Pat. No. 5,019,699 to Koenck, incorporated herein by reference, describes a hand-held optical scanner, which includes a lens system having circular symmetry. The lens system focuses the full width of the object onto an array of photosensitive cells, with a single flash of a ring-type xenon flash tube, which surrounds the lens system and is symmetrically arranged relative to the optical axis. In this way, the object can be scanned at any angle relative to the array of photosensitive cells, and the scanned image, stored in digital form, can be electronically rotated to a desired orientation, before it is decoded.

U.S. Pat. No. 5,834,749 to Durbin, incorporated herein by reference, describes a hand-held scanner for reading images at oblique angles, in order for the scanning unit not to interfere with the user's view of the scanned image. The distortion to an obliquely scanned image, arising from the oblique scanning, can be corrected by any of several correction techniques, as follows:

1. a ratio of vertical to horizontal line densities of the array of photosensitive cells can be chosen to compensate for the vertical foreshortening of the scanned image;

2. the array of photosensitive cells can be oriented at an oblique angle with respect to the optical axis, to compensate for the distortion inherent in the oblique scanning;

3. a lens system can be configured to provide varying degrees of magnification along its surface; and as taught by U.S. Pat. No. 5,019,699, to Koenck, described hereinabove, processing techniques can electronically re-orient the scanned image after storing it in the scanner's memory.

Hand-held, stand-alone, optical scanners that produce audio output are known. U.S. Pat. No. 5,945,656 to Lemelson, et al, incorporated herein by reference, describes a pen-like stand-alone scanner for transuding coded data into pre-coded pieces of speech or music. Generally, a scanning guide is attached to a book, arranged for guiding the pen-like scanner vertically along an edge of the book, which contains coded information. Aided by the guide, children may scan the coded data and produce the sounds associated with them.

U.S. Pat. No. 5,767,494 to Matsueda, et al., incorporated herein by reference, describes a system for reproducing multimedia information, recorded with an optically readable code. The code is a dot-code format described in U.S. Ser. No. 08/407,018 (PCT Publication No. WO 94/08314), and includes two-dimensional patterns that convey multimedia information, for example, audio information like speech and music, image information obtained from a camera or a video device, and digital code data obtained from the user's computer. The system uses paper as a basic information-storage medium for the optically readable code, and includes a preferably pen-like scanner, arranged to read the code. The system may reproduce the original multimedia information by appropriate hardware such as a display screen, a printer, or a speaker, and includes a speech synthesizer. In some embodiments, the pen-like scanner is a stand-alone unit, and may include earphones.

The IRISPen of Image Recognition Integrated Systems Inc., of Rue Du Bosquest 10, 1348 Louvain-la-Neuve, Belgium, is a pen-like scanner that allows the user to scan text, bar codes and handwritten numbers into any Windows or Mac application. The IRISPen is hooked up to any desktop or portable computer without any additional interface boards. The IRISPen is not stand-alone apparatus.

The IRISPen Executive™ integrates text-to-speech technology from Lernout & Hauspie, in six languages (English, French, German, Dutch, Spanish and Italian). It provides natural audio feedback of all recognized words and numbers as it scans the information. The purpose of the text-to-speech technology is to reduce the need of the user to keep his eyes on the computer screen to verify recognition. The IRISPen Translator is further arranged to automatically translate text between English and German. Output may be in the form of written text in the translated language, displayed on a computer screen or printed. Alternatively, the output may be an audio output, in the translated language.

The IRISPen Executive™, the IRISPen Translator, and other IRISPen products are not stand-alone apparatus. Rather, they are arranged to operate with a computer, such as a desktop PC or a notebook computer, into which the IRISPen software has been installed. The output language is the language that has been installed to the computer, and cannot be changed during a scanning operation. An audio output may be provided only in the original language or only in the translated language. Furthermore, the automatic translation language is not intrinsic to the IRISPen Translator. Rather, it has to be installed on the computer that supports the IRISPen. Neither are the speaker or earphones for audio output intrinsic to the IRISPen. Instead, the computer speakers are used for the audio output. Therefore, the IRISPen is not a single product but a package of several products, which are sold together and are arranged to operate together.

Text-to-speech (TTS) syntheses, additional to the technology of Lernout & Hauspie of the IRISPen Executive™, are known. Bell Labs and Edinburgh University have developed a text-to-speech synthesis based on a Spoken Text Markup Language (STML) standard. STML later became SABLE. Sun Microsystems, Inc., in partnership with other speech-technology companies, has worked to define the specifications for a Java Speech API and a Java Speech Markup Language (JSML), incorporating many of the aspects of SABLE. JSML has been accepted by W3C (the organization responsible for WWW standards) as a standard. Bell Labs Lucent Technologies now offer a text-to-speech synthesis, which provides choices between voices of a man, a woman or a child and a speech rate that is fast, normal or slow. The University of Edinbourgh has developed a generally multi-lingual system known as The Festival Speech Synthesis System, available in English (British and American), Spanish and Welsh. Additionally, Digital offers the DECtalk™ Speech Synthesizer which converts ASCII text to natural-sounding speech output. IBM offers the V5.1 speech synthesizer. Apple offers "English Text-to-Speech" software with recent versions of the MacOS. The University of York has produced YorkTalk, Oxford University offers an all-prosodic speech synthesizer entitled IPOX. Telcordia Technologies (formerly Bellcore) have developed the ORATOR and an improved version, the ORATOR II. Entropic Research Laboratory, Inc. offers TrueTalk 1.0, a software-only text-to-speech system based on a major research effort at AT&T Bell Laboratories. AT&T has developed Next-Generation TTS to convert machine-readable English text into audible speech. The Speech Technology Unit at BT has produced, and is continuing to develop, a sophisticated text-to-speech system called Laureate. Eurovocs is still another commercially available, text-to-speech product. BORIS is a high-quality, diphone-based text-to-speech converter for Spanish, developed by Universidad Politecnica de Madrid. Lycos Search offers a text-to-speech synthesizer, as do SoftVoice, Inc., Eloquent Technology, Inc., and many other companies.

Lernout & Hauspie, which developed the technology of the IRISPen Executive™, described hereinabove, offers a multi-lingual, text-to-speech system in British English, Dutch, French, German, Italian, Japanese, Korean, Portuguese (Brazilian), Russian and Spanish.

HMM-Based Trainable Speech Synthesis has developed a speech synthesis which uses a set of decision-tree state-clustered Hidden Markov Models. The system automatically selects and segments a set of HMM-state sized sub-word units from a continuous-speech database of a single speaker for one hour for use in a concatenation synthesizer, to produce highly intelligible, fluent speech. It can be retrained on a new voice in less than 48 hours.

Automatic translation, additional to the technology of the IRISPen Translator, are known. For example, Language Teacher of Ectaco, 1205 E. Pike, Seattle, Wash. 98122, is a pocket, electronic dictionary and translator with 2 million words and phrases, which generally operates as a stand-alone unit. Some models may be connected to user's computers and interact with Windows 95 or 98. It is available for translation between English and any of the following languages: Albanian, Arabic, Bulgarian, Chinese, Czech, French, German, Greek, Hebrew, Hungarian, Italian, Latvian, Polish, Portuguese, Romanian, Russian, Serbo-Croatian, Spanish, Turkish, Vietnamese, and Yiddish.

The Language Teacher includes words as well as phrases, idioms, irregular verbs, and linguistic games and grammar. It further includes a built-in, voice synthesizer which produces an audio output in multiple languages. Additionally, the Language Teacher includes an organizer. A digital voice recorder stores up to 15 minutes of human speech. Its model Partner is designed to translate texts, and send and receive e-mail and faxes.

There is a wide selection of automatic translation software, for example, Deluxe Universal Translator, of LanguageForce, Easy Translator 3, of Transparent Language, L&H Power Translator Pro, of L&H Speech Products, and Translation Manager 2.0, of IBM.

Software for correcting the user's pronunciation is known. For example, "Talk to Me™, by Globalink, Inc., Fairfax, Va., is software, arranged for a PC computer. The user may use the software to listen to a dialogue and to try to reproduce it. The software records the user's voice and compares its signals with those which would be produced by a native speaker, displaying to the user the differences in signal forms.

SUMMARY OF THE INVENTION

The present invention relates to automatically presenting at least one definition in context, for a dictionary entry, based a contextual analysis of the grammatical unit, such as the sentence, the clause, or the phrase, in which the dictionary entry is embedded. The dictionary entry may be single word, for example, "consideration," or a word combination, such as "due to," provided the word combination appears in an ordinary dictionary as a single entry. A definition in context will generally include a definition in accordance with the function of the word in the grammatical unit, and may further include a preferred definition from among several options for the same function, based on contextual clues within the grammatical unit. Similarly, a translation in context may be presented. The present invention further relates to a method of preparing automatic-translation viable documents, in a first language, adapted for accurate automatic translation, to a plurality of languages. Additionally, interactive automatic translation software is taught, for use in tandem with a human translator. These may be performed by a supercomputer, a personal computer, a laptop, a palm-top, a stand-alone hand-held, computerized scanning apparatus, or over the web.

In accordance with an aspect of the present invention, there is provided a method of presenting at least one definition for a dictionary entry, which includes:

providing a dictionary entry, which has been encountered when embedded within a grammatical unit;

providing the grammatical unit;

performing a contextual analysis of the dictionary entry when embedded within the grammatical unit; and presenting the at least one definition for the dictionary entry, based on the contextual analysis.

Additionally, the grammatical unit is selected from the group consisting of a simple sentence, a compound sentence, a clause, a phrase, and a combination thereof.

Furthermore, the presenting the at least one definition includes presenting at least one definition in accordance with the function of the dictionary entry, when embedded within the grammatical unit.

Additionally, the presenting the at least one definition includes generating at least one definition, when the function of the dictionary entry when embedded within the grammatical unit is not listed in an ordinary dictionary.

Alternatively, the presenting the at least one definition includes narrowing down definition choices based on contextual clues.

Additionally, the presenting the at least one definition includes narrowing down definition choices based on a comparison with an exposure basis.

Additionally, the presenting the at least one definition includes presenting several definitions for the dictionary entry, and ranking the several definitions, in accordance with their likelihood when embedded within the grammatical unit, based on the contextual analysis.

Additionally, the method includes presenting additional definitions, not based on the contextual analysis, for general background knowledge, and denoting the additional definitions as not based on the contextual analysis.

Additionally or alternatively, the method includes presenting at least one translation to a second language, for the dictionary entry, based on the contextual analysis of the grammatical unit.

Additionally, the method is performed by a device selected from the group consisting of a supercomputer, a personal computer, a laptop, a palmtop, a stand-alone, hand-held computerized scanning apparatus, a hand-held scanning apparatus operative with a computerized device, and a microphone operative with a computerized device.

Additionally or alternatively, the method is performed by interacting with a web site.

In accordance with another aspect of the present invention, there is provided a stand-alone, hand-held, computerized scanning apparatus, which includes:

a body, having a proximal end with respect to a portion of text, in a first language;

a scanner, located within the body, substantially at the proximal end, adapted for scanning the portion of text, in the first language, wherein the portion of text is selected from the group consisting of at least one phrase, at least one clause, at least one sentence, at least two sentences, and a combination thereof;

a computerized system, located within the body, in communication with the scanner, adapted for performing:

OCR conversion of the scanned portion of text; and contextual analysis of phrases, clauses and sentences, in the first language; and a user-interactive feature, in communication with the computerized system, adapted for marking a dictionary entry embedded within a grammatical unit, the grammatical unit being selected from the group consisting of a phrase, a clause and a sentence, in the portion of text.

Additionally, the apparatus includes at least one output system, in communication with the computerized system, for presenting at least one definition for the dictionary entry, based on a contextual analysis of the grammatical unit.

In accordance with still another aspect of the present invention, there is provided a stand-alone, hand-held, computerized scanning apparatus, which includes:

a body, having a proximal end with respect to a portion of text, in a first language;

a scanner, located within the body, substantially at the proximal end, adapted for scanning the portion of text, in the first language, wherein the portion of text is selected from the group consisting of at least one clause, at least one sentence, at least two sentences, and a combination thereof; and a computerized system, located within the body, in communication with the scanner, adapted for performing:

OCR conversion of the scanned portion of text; and automatic translation of a grammatical unit, selected from the group consisting of at least one clause, at least one sentence, at least two sentences, and a combination thereof, to a second language.

Additionally, the apparatus includes at least one output system, in communication with the computerized system, for providing the automatic translation.

Additionally, the automatic translation of the grammatical unit includes at least two versions of automatic translation of the grammatical unit, for a user to choose from.

In accordance with yet another aspect of the present invention, there is provided a method of preparing an automatic-translation viable document, which includes:

providing a document in a first language, in a soft format;

pointing out, by a computerized device, ambiguities in the document in the first language, for an automatic translation software; and removing the ambiguities.

Additionally, the pointing out includes pointing out by attempting an automatic translation of the document in a first language, and encountering the ambiguities.

Additionally, the removing includes adding hidden clues which are not seen by a reader.

Alternatively, the removing includes rephrasing.

In accordance with still another aspect of the present invention, there is provided a method of translating a document, which includes:

providing a document in a first language, in a soft format;

attempting an automatic translation of the document, using an automatic translation software;

allowing the automatic translation software to point out ambiguities in the document in the first language; and removing each of the ambiguities, from the document in the first language; and translating the document, to form a translated document in the second language.

Additionally, the attempting is performed in a stepwise manner, per grammatical unit.

Additionally, the translating the document includes suggesting at least one translation, for each grammatical unit, for a human translator to approve.

Additionally, the translating the document includes suggesting at least two versions of translation, per grammatical unit, for a human translator to choose from.

Additionally, the method includes:

comparing the translated document in the second language against an exposure basis of the second language; and rephrasing the translated document in the second language, based on the comparing.

In accordance with yet another aspect of the present invention, there is provided a method of translating documents, which includes:

providing a document in a first language;

translating the document, to produce a translated document in a second language;

comparing the translated document in the second language against an exposure basis of the second language; and rephrasing the translated document in the second language, based on the comparing.

Additionally, the translating the document includes automatically translating the document.

Additionally, the providing the document in the first language includes providing an automatic-translation viable document in the first language.

In accordance with still another aspect of the present invention, there is provided a stand-alone, hand-held computerized scanning apparatus, which includes:

a body, having a proximal end with respect to a portion of music notes;

a scanner, located within the body, substantially at the proximal end, adapted for scanning the portion of music notes; and a computerized system, located within the body, in communication with the scanner, adapted for converting the portion of music notes to music.

Additionally, the apparatus includes at least one sound output system, in communication with the computerized system, for providing an output of the music.

Additionally or alternatively, the apparatus is adapted for connecting to a sound system.

Additionally, the apparatus is adapted for producing the music in a sound of a desired instrument.

BRIEF DESCRIPTION OF THE DRAWINGS

The present invention will be more clearly understood from the accompanying detailed description and drawings, in which same number designations are generally maintained throughout the figures for similar elements and in which:

FIGS. 1A-1J schematically illustrate computerized devices for language acquisition, in accordance with the present invention;

FIGS. 2A and 2B schematically illustrate internal and external elements, respectively, of a stand-alone, hand-held, computerized scanning apparatus, in accordance with a preferred embodiment of the present invention;

FIG. 6B is a flowchart of a fifth reading protocol, in accordance with the present invention;

FIG. 7 is a flowchart of a sixth reading protocol, in accordance with the present invention;

FIGS. 9A-9C schematically illustrate different arrangements for scanner systems, in accordance with the present invention;

FIGS. 10A and 10B schematically illustrate a stand-alone, hand-held, computerized scanning apparatus, in accordance with another embodiment of the present invention;

FIG. 11 schematically illustrates a stand-alone, hand-held, computerized scanning apparatus, in accordance with still another embodiment of the present invention;

FIGS. 12A-12B are presented as tables, and illustrating the manner of breaking down a grammatical unit into functions, for contextual analysis, in accordance with the present invention;

FIGS. 12C-12D are presented as tables, and illustrating the manner of constructing general templates of grammatical units, for contextual analysis, in accordance with the present invention;

FIGS. 13A-13E are presented as tables, representing a partial listing of functions and attributes, which may be of help, when performing contextual analysis, in accordance with the present invention;

FIG. 14 schematically represents a segment of a language exposure basis, in accordance with the present invention;

FIGS. 15A-15C schematically illustrate the manner of breaking down grammatical units of the exposure basis to functional templates, specific to a language, and comparing the functional templates of different languages, in accordance with the present invention;

DETAILED DESCRIPTION OF PREFERRED EMBODIMENTS

Figure 1A:
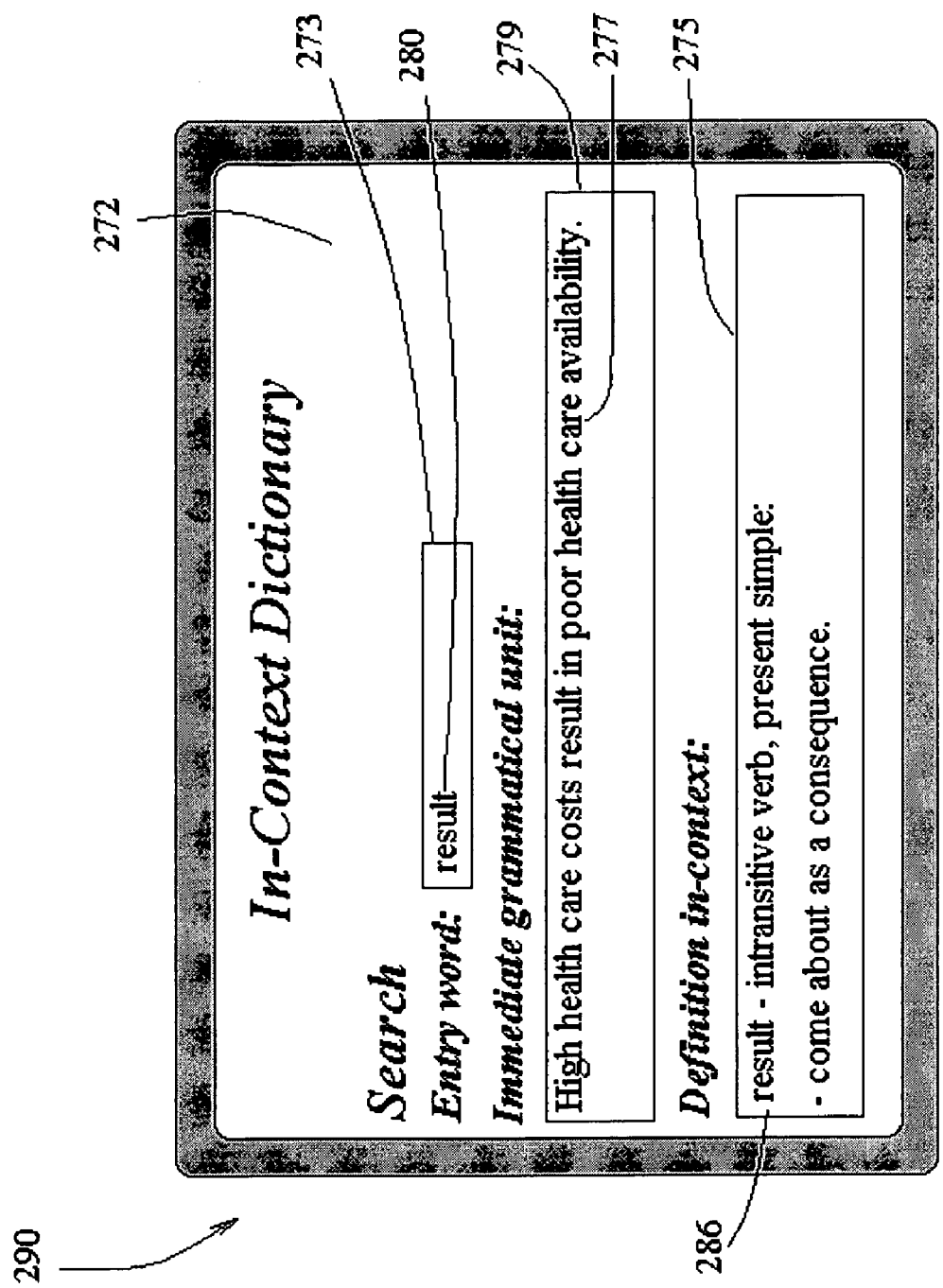

The present invention relates to automatically presenting at least one definition in context, for a dictionary entry, based a contextual analysis of the grammatical unit, such as the sentence, the clause, or the phrase, in which the dictionary entry is embedded. The dictionary entry may be single word, for example, "consideration," or a word combination, such as "due to," provided the word combination appears in an ordinary dictionary as a single entry. A definition in context will generally include a definition in accordance with the function of the word in the grammatical unit, and may further include a preferred definition from among several options for the same function, based on contextual clues within the grammatical unit. Similarly, a translation in context may be presented. The present invention further relates to a method of preparing automatic-translation viable documents, in a first language, adapted for accurate automatic translation, to a plurality of languages. Additionally, interactive automatic translation software is taught, for use in tandem with a human translator. These may be performed by a supercomputer, a personal computer, a laptop, a palmtop, a stand-alone hand-held, computerized scanning apparatus, or over the web.

The contextual analysis, in accordance with the present invention, relates at least to an analysis of the basic functional components in a given grammatical unit. For example, a contextual analysis of, "The girl dances beautifully," relates at least to the following analysis: The—article; girl—noun; dances—verb; beautifully—adverb. Similarly, a contextual analysis of, "By the river, they built a fire," relates at least to the following analysis: By the river—adverbial phrase; they—noun; built—verb; a—article; fire—noun.

Thus, providing a definition based on the contextual analysis relates at least to providing a definition, in accordance with the function of the dictionary entry, in context.

Additionally, the contextual analysis may relate to further narrowing down the definition choices for a given function, by eliminating those choices that are probably inappropriate in a particular context.

On the other hand, the contextual analysis may relate to generating definitions for a dictionary entry, in accordance with the function, in context, when those are not available in an ordinary dictionary.

In general, contextual clues for these analyses are present within the grammatical units, since otherwise it would be impossible for humans to understand each other. The task, in requiring that they are performed automatically, is to define these clues, in a manner that can be translated to a computer language.

The contextual analysis in accordance with the present invention may be similar for example to a grammatical analysis performed by Word, when checking "Spelling and Grammar." Additionally or alternatively, it may be similar to the contextual analysis performed by automatic translation software, as known. Additionally or alternatively, other contextual analyses may be performed.

Reference is now made to FIGS. 1A-1J, which schematically illustrate a manner of presenting at least one definition in context, by computerized devices, in accordance with the present invention.

FIG. 1A schematically illustrates an in-context dictionary 190, operating on a computer screen 272, and adapted to provide a definition by function for a dictionary entry, when embedded within a grammatical unit, in accordance with the present invention.

A dictionary entry 280, "result" may be entered in an entry box 273. An immediate grammatical unit 277 associated with it, "High health care costs result in poor health care availability," is entered in a grammatical unit entry box 279. A definition in context 286 may then be presented in a definition box 275, as follows: "result—intransitive verb, present simple: come about as a consequence," for example, based on the American Heritage® Dictionary of the English Language: Fourth Edition, 2000, http://www.bartleby.com/61/.

Definition in context 286 was arrived at after performing a contextual analysis of immediate grammatical unit 277 and determining at least the following: High health care costs—noun phrase; result—verb; in—preposition; poor health care availability—noun phrase.

Some clues that in-context dictionary 190 may use, in order to arrive at the function for result are as follows:

i. as a starting point, Merriam-Webster OnLine Dictionary (http://www.m-w.com) offers two entries for "result," as an intransitive verb and as a noun, so these two choices must be considered;

ii. if "result" were a noun, and since it is in the singular form, an article, such as "a" or "the," or an adjective, for example, "your," or "no" would precede it; and iii. as a noun, "result" is generally associated with the preposition "of," ("The results of our study were . . . ") while as a verb, result is generally associated with the preposition "in," ("Our study resulted in the following:"), or with the preposition "from" (His success resulted from his hard work").

It follows that in the present context, "result" functions as an intransitive verb.

Once it is determined that "result" is a verb, the other functional parts of grammatical unit 277 fall in place.

It will be appreciated that when grammatical unit 277 is a sentence, the contextual analysis preferably begins by identifying the predicate. Generally, the noun that precedes it is the subject, and the other parts of the sentence can then be identified. Other grammatical units have specific structures, and may similarly be analyzed in accordance with their structure, for example, as taught in conjunction with FIGS. 12A-12D, hereinbelow.

It will be appreciated that other contextual clues may similarly be used.

Figure 1B:
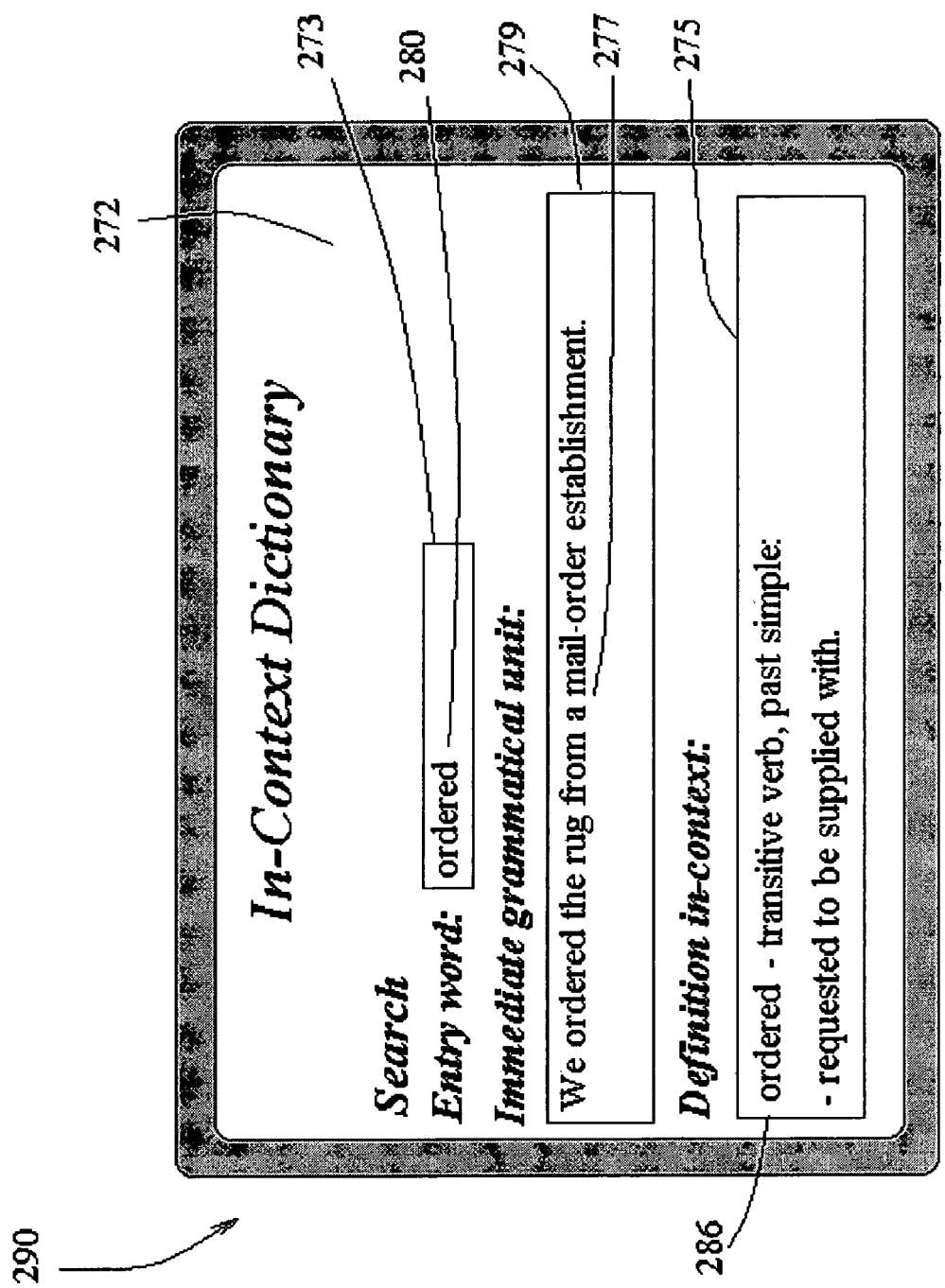

FIG. 1B schematically illustrates in-context dictionary 190 adapted to further narrow down definition choices, after the function has been determined, base on contextual clues in the immediate grammatical unit.

Dictionary entry 280, "order" may be entered in entry box 273. Immediate grammatical unit 277 associated with it, "We ordered the rug from a mail-order establishment," is entered in a grammatical unit entry box 279. A definition in context 286 may then be presented in definition box 275, as follows: "order—transitive verb, past simple: requested to be supplied with," for example, based on the American Heritage® Dictionary.

Some clues that in-context dictionary 190 may use, in order to narrow down the definition choices for "to order" as a transitive verb, may be the following:

i. when one orders humans, as in "The sergeant ordered the soldiers to clean the barracks," then "to order" probably means to command, since in general, one does not order people, in the sense of requesting that the people be delivered;

ii. when one orders objects, as in "We would like to order some tea," then, "to order" probably means to request that the objects be delivered, since in general, one does not order objects, in the sense of commanding the objects to perform a specific task;

iii. when "order" is followed by an action, it is a directive, as in "The judge ordered a recount of the ballot";

iv. when "order" is followed by an adverb or an adverbial phrase which pertains to a specific arrangement, as in "Please order these files, alphabetically," then, "to order" means to put in order, to organize;

v. when "order" is followed by the preposition "to," it generally means to command, as in "The sergeant ordered the soldiers to clean the barracks";

vi. when "order" is followed by the preposition "off," it generally means to remove oneself, as in "The landlord ordered them off the property";

vii. when "order" is followed by the preposition "from" it generally means to request that certain objects be delivered, as in as in "We ordered these from a mail order catalog"; and viii. when "order" is followed by the preposition "according to," it generally means to organize, put in order.

In the present example, both the fact that a rug in an object and the fact that "ordered" is followed by the preposition "from" may be used as contextual clues. Thus, the preferred definition choice, in context, for "ordered" was as shown in FIG. 1B.

As another example, adjective association may also be used for contextual clues, to narrow down definition choices. For example:

i. in "old order" and "social order," the word "order" means "a sociopolitical system"; and ii. in "working order" and "functioning order" the word "order" means a state or a condition.

As still another example, general word association in the grammatical unit may be used for contextual clues, to narrow down definition choices. For example, in the sentence:

"The anchoring element allows the surgeon to accurately secure the mesh in the desired position."

One of the definitions of The American Heritage® Dictionary for "anchor" as a transitive verb, is, "To hold fast by or as if by an anchor." Therefore, when choosing a definition for "secure" as a transitive verb, from among, the following:

i. "to guard from danger or risk of loss";

ii. "to make firm or tight; fasten";

iii. "to make certain; ensure";

iv. "to guarantee payment of";

v. "to guarantee payment to";

vi. "to get possession of";

vii. "to acquire";

viii. "To capture or confine";

ix. "to bring about"; and x. "to protect or ensure the privacy or secrecy of"

the association between "anchor" and "secure," will lead to choosing definition (ii) as the most likely, in the context of the present example.

Thus, contextual clues in the immediate grammatical unit, which may be used for automatically narrowing down the number of definition choices may relate to presenting at least one definition, as follows:

i. in accordance with the function in the grammatical unit;

ii. in accordance with a particular preposition;

iii. in accordance with a particular adjective or adjective phrase;

iv. in accordance with a particular adverb or adverbial phrase;

vi. based on a word association in the grammatical unit; and vii. based on other contextual clues, for example, whether a specific noun is a human, an animal, a vegetable, an inanimate object, a time duration, a specific time, or an action.

Figure 1C:
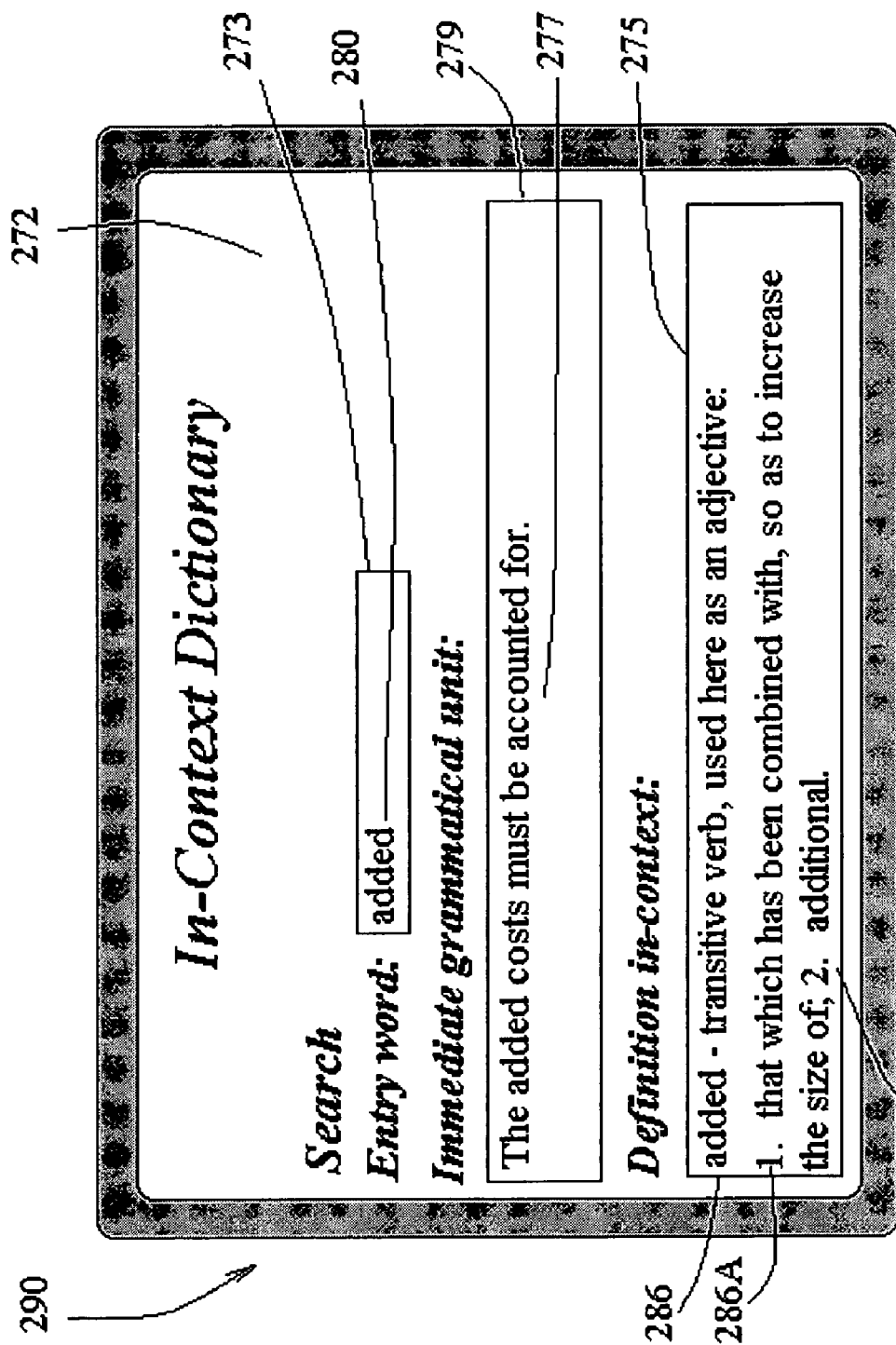
Figure 1D:
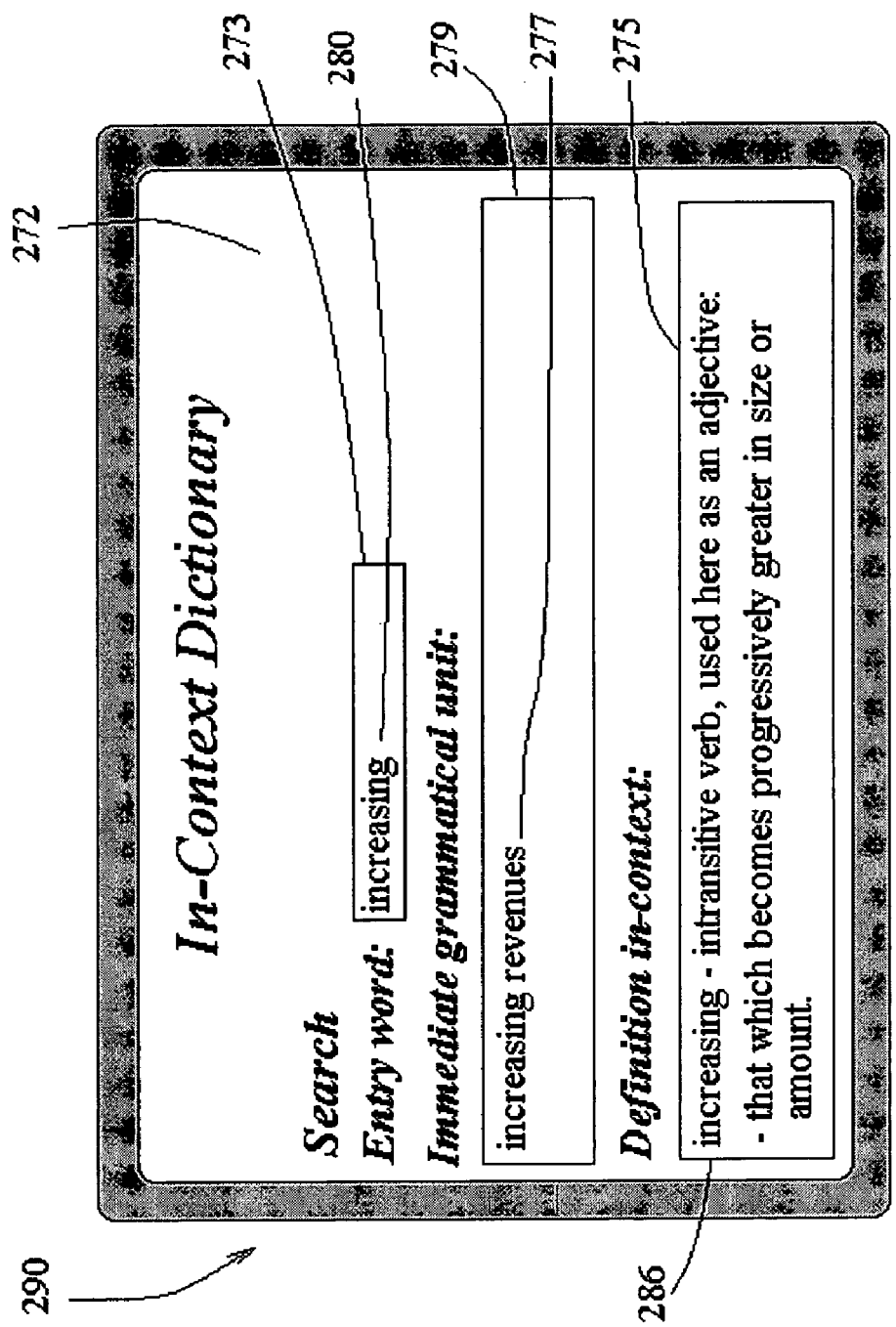
Figure 1E:
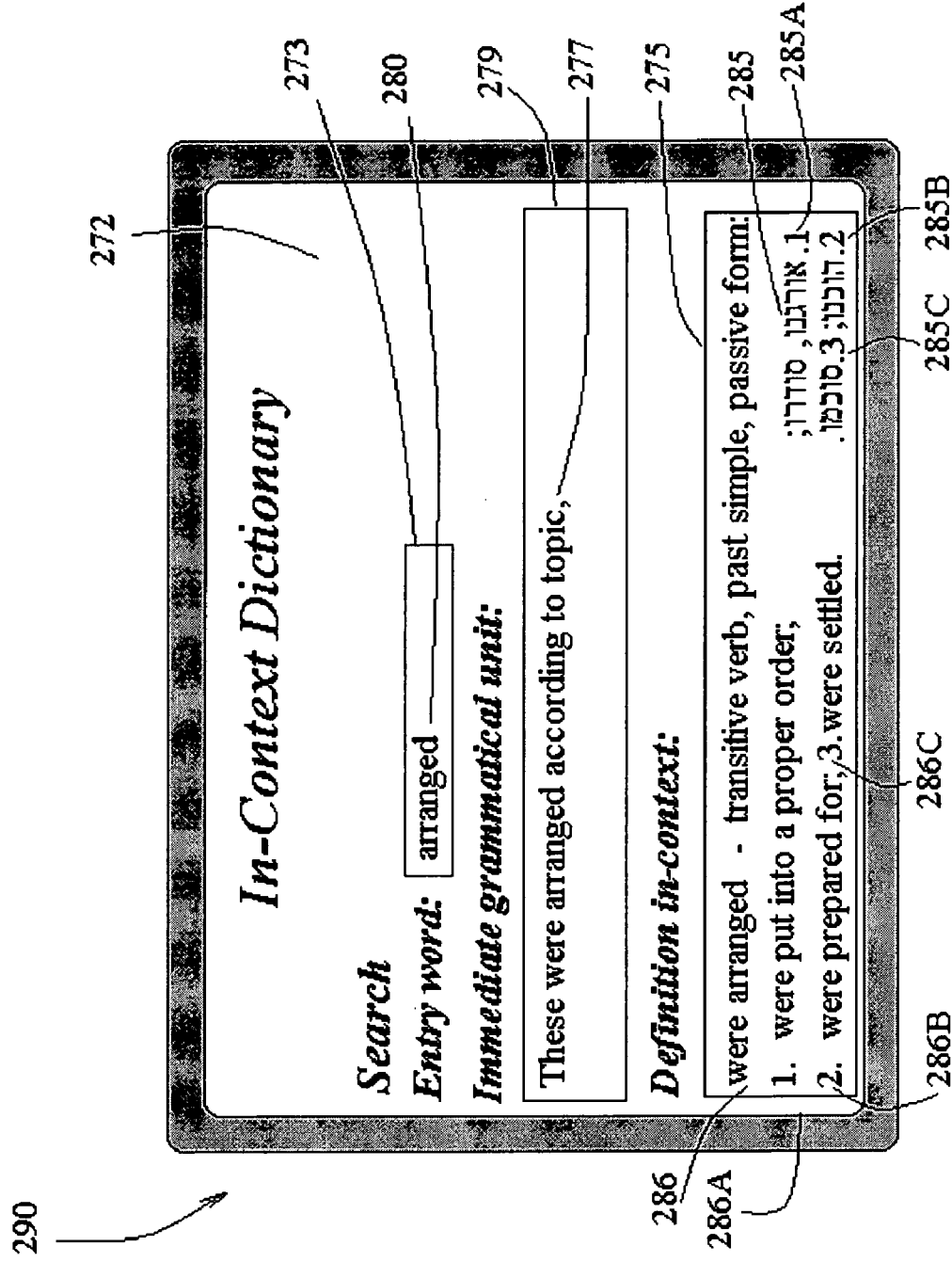

On the other hand, automatically presenting at least one definition in context may require automatically generating definitions, when these are not available in ordinary dictionaries, as illustrated in FIGS. 1C-1E, hereinbelow.

FIG. 1C schematically illustrates in-context dictionary 190 adapted for generating at least one definition for a participle, when functioning as an adjective, in accordance with the present invention.

Dictionary entry 280, "added" may be entered in entry box 273. Immediate grammatical unit 277 associated with it, "The added costs must be accounted for," is entered in grammatical unit entry box 279. A definition in context 286 may then be presented in a definition box 275, as follows: "added—transitive verb, used here as an adjective:" Additionally, in accordance with the present example two definitions 286A and 286B are presented in the order of their likelihood, as follows: "1. that which has been combined with, so as to increase the size of; and 2. additional."

FIG. 1D schematically illustrates in-context dictionary 190 adapted for generating at least one definition for a gerund, when functioning as an adjective, in accordance with the present invention.

Dictionary entry 280, "increasing" may be entered in entry box 273. Immediate grammatical unit 277 associated with it, "increasing revenues," is entered in grammatical unit entry box 279. A definition in context 286 may then be presented in a definition box 275, as follows: "increasing—intransitive verb, used here as an adjective: that which becomes progressively greater in size or amount."

FIG. 1E schematically illustrates in-context dictionary 190 adapted for generating at least one definition for a verb in the passive form, in accordance with the present invention.

Dictionary entry 280, "arranged" may be entered in entry box 273. Immediate grammatical unit 277 associated with it, "These were arranged according to topic," is entered in grammatical unit entry box 279. A definition in context 286 may then be presented in a definition box 275. In the present example, three definitions 286A, 286B, and 286C are provided, ordered by likelihood, as follows: "were arranged—transitive verb, past simple, passive form: 1. were put into a proper order; 2. were prepared for; 3. were settled." Additionally, three translations in context, 285A, 285B and 285C may be provided.

Contextual analysis for the present example included the following steps:

i. determining that the function of "arranged" is a transitive verb;

ii. narrowing down the definition choices for "arranged" as a transitive verb;

iii. generating a definition in the passive form; and iv. generating a definition in the past simple, plural form.

While items (i), (iii), and (iv) may be obtained from basic rules of grammar, item (ii) may not be straight forward. Merriam-Webster OnLine Dictionary includes four definitions for "arrange" as a transitive verb, as follows, to make preparations for, to put into a proper order, to adapt a musical composition form new voices or instruments, to settle.

The contextual clue that was used by in-context dictionary 190 to arrive at choice (ii) was the adverbial clause "according to topic." However, even though to put into a proper order seemed the most likely definition choice, the other definition choices could not be ruled out, and were therefore maintained, but noted as less likely.

It will be appreciated that automatically generating definitions, when these are not available in ordinary dictionaries, may include the following:

i. automatically generating definitions for the infinitive and gerund, when functioning as actions, for example, in "To smoke is hazardous," and "Smoking is hazardous;

ii. automatically generating definitions for the participle and gerund, when functioning as adjectives;

iii. automatically generating definitions for the nouns, when operating as attributive nouns so a to function as adjectives, for example, in "city lights";

iv. automatically generating definitions for the passive form, for example, in "These were arranged according to topic";

v. automatically generating definitions for the specific tense; and vi. automatically generating definitions for specific forms, such as singular, plural, masculine or feminine (where appropriate).

In accordance with the present invention, in-context dictionary 190 may also be operative in the background, while working on a document, or when reading a document off screen 272.

Figure 1F:
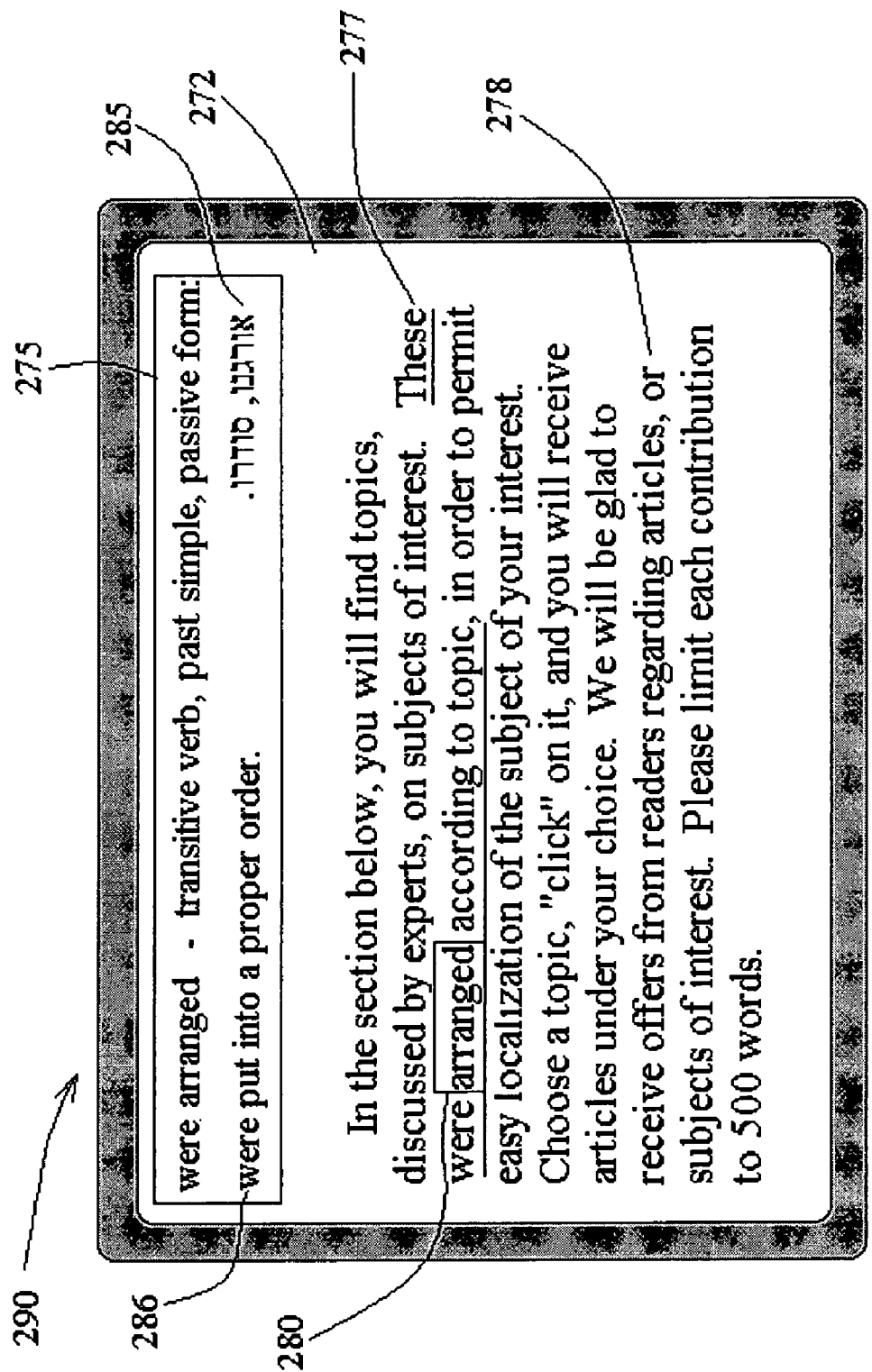

FIG. 1F schematically illustrates in-context dictionary 190 operating with a document 278. When dictionary entry 180, "were arranged," is marked, contextual analysis of immediate grammatical unit 277, "These were arranged according to topic," is performed, and definition in context 286 and possibly also translation in context 285, are presented in a window 279, as before.

It will be appreciated that an in-context dictionary and an in-context analysis may apply to languages other than English. For example, in Hebrew, the literal translation of "the working man" is "the man the working." Contextual analysis in Hebrew may determine that "working" functions as an adjective, because it is preceded by a definite article. In a similar manner other contextual clues may be used, for different languages, as applicable.

It will be further appreciated that other definitions, not based on the contextual analysis may also be provided, for general knowledge, wherein the definition or definitions, in accordance with the contextual analysis are marked or noted as preferred.

Contextual analysis, in accordance with the present invention, may be performed on various computerized devices, including supercomputers, personal computers, laptops, palmtops, computerized stand-alone, hand-held scanning apparatus, scanning devices in combination with other computerized devices, and microphone devices in combination with other computerized devices.

Additionally, the contextual analysis may be provided as software, for example, on a CD, a diskette, or the like, or as software that may be downloaded from a web site. As another example, the contextual analysis may be performed by interacting with a web site.

Furthermore, in-context dictionary 190 may be provided as software, for example, on a CD, a diskette, or the like, or as software that may be downloaded from a web site. Additionally or alternatively, in-context dictionary 190 may be used via a web site.

The grammatical unit and the dictionary entry, which is embedded in it may be stored in the computer memory, input into the computer using a keyboard, read by a reading device, scanned by a scanning device, audibly fed by a microphone device, or otherwise input, as known.

As seen in FIG. 1G, display screen 272 may be associated with a personal computer 270, wherein text may be input into computer 270, for example, using a keyboard 274, and marked, for example, using a mouse 276. Alternatively, the test may be stored in the computer memory, read from a reading device, downloaded from the web, scanned onto the computer, input via a microphone, or input in any other known way.

Alternatively, as seen in FIGS. 1H and 1I, display screen 272 may be associated with a laptop 282, or a palmtop 284. Additionally or alternatively, a supercomputer or another computerized device may be used.

Figure 1J:
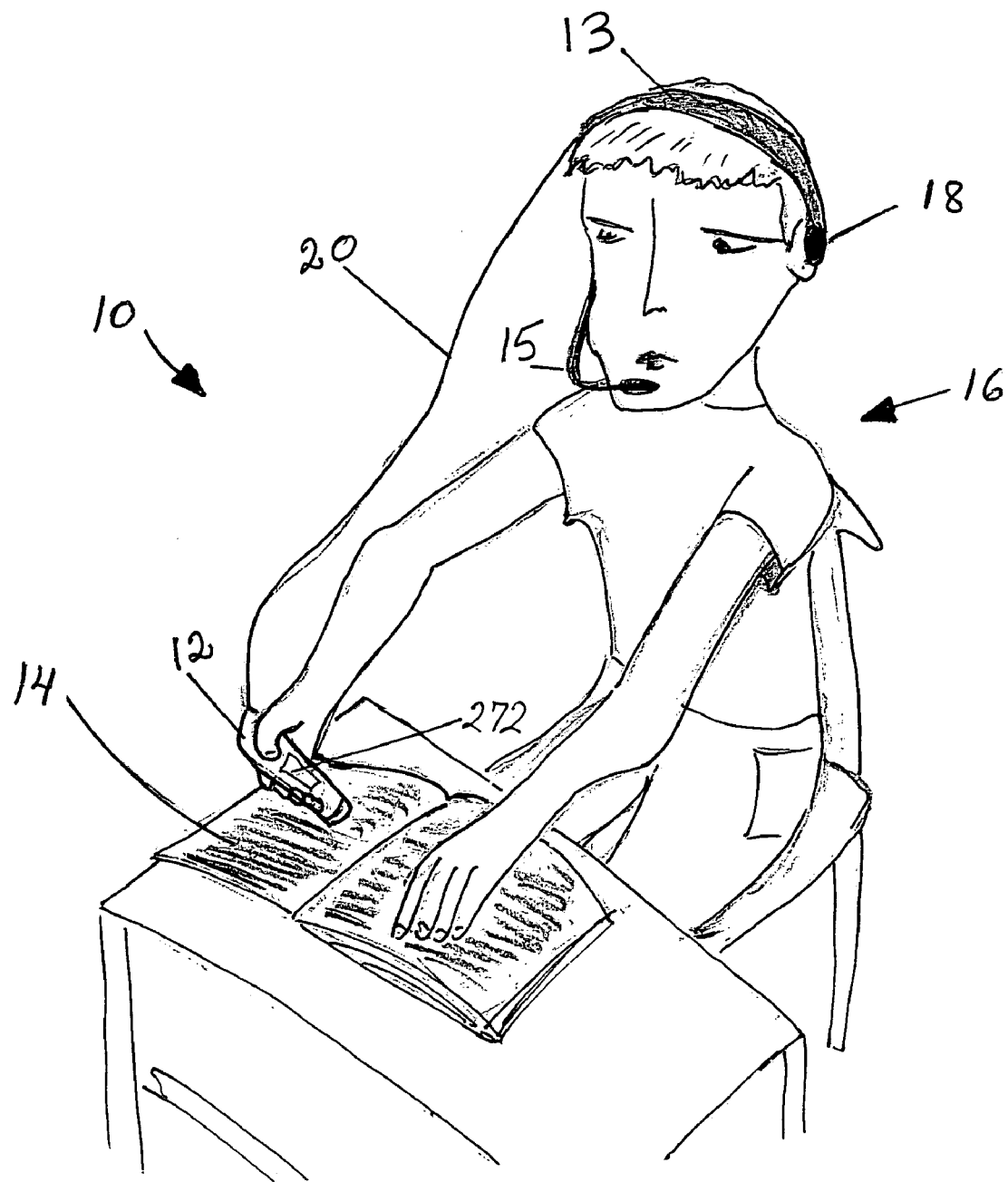

As seen in FIG. 1J, display screen 272 may be associated with a stand-alone, hand-held, computerized scanning apparatus 10, in accordance with a preferred embodiment of the present invention.

In accordance with an alternative embodiment, apparatus 10 may be used in combination with a computer system, such as any of the systems of FIGS. 1G-1I, to scan a portion of text, and to mark a specific dictionary entry. The text may then be fed to a computer, and an analysis for a definition or a translation in context, for example, at least by function, may proceed as described.

FIG. 1J schematically illustrates a preferred embodiment of the present invention, in which definitions and translations in context, text-to-speech syntheses, and automatic translations are provided on the go, by stand-alone, hand-held, computerized scanning apparatus 10.

It will be appreciated that a distinction has to be made between translating automatically and automatic translation. Translating automatically relates to devices and methods that provide automatically a translation to a dictionary entry, a word or a word combination that appears as a single entry in a dictionary. These devices and methods cannot translate automatically a sentence, such as, "Please come home," since this sentence is not likely to appear in a dictionary, as a single entry.

On the other hand, automatic translation is accepted in the art as the name of software whose input is a syntactically correct phrase, clause or sentence in a first language and whose output is a syntactically correct translation of the phrase, clause or sentence, to a second language, by combining translations of several dictionary entries, in a syntactically correct manner.

Preferably, apparatus 10 provides audio outputs of automatic text-to-speech synthesis of a portion of text 14, in a first language, and preferably also automatic translation to a second language, while enabling a user 16 to maintain visual contact with text 14. Preferably, apparatus 10 includes a device 12, hand-held by user 16, a cable 20, and one or two earphones 18, which are worn by user 16, as a headgear 13. As user 16 moves hand-held device 12 across text 14, he hears text 14 read aloud to him and preferably also automatically translated, through earphones 18. However, in some embodiments of the present invention, cable 20 is not used, and communication between device 12 and earphones 18 is wireless.

Preferably, user 16 is a native speaker of the second language, eager to be exposed simultaneously to text 14 in its written and spoken forms, and to its interpretation. Preferably, apparatus 10 offers several reading and translation protocols for user 16 to choose from, as will be described hereinbelow, in conjunction with FIGS. 3-5.

Alternatively, user 16 is a native speaker of the language of text 14, learning to read the language of text 14 through simultaneous exposure to its written and spoken forms. Preferably, user 16 is aided by a built-in dictionary, for rephrasing unfamiliar words and phrases with familiar ones, upon request, as will be described hereinbelow, in conjunction with FIGS. 6A and 6B.

Alternatively or additionally, apparatus 10 may include a pronunciation teaching program and a microphone 15 into which user 16 reads aloud text 14, after hearing it read to him by apparatus 10, as will be described hereinbelow, in conjunction with FIG. 7. Microphone 15 may be mounted on headgear 13, and may be further used to communicate with apparatus 10, via voice commands.

Alternatively or additionally, apparatus 10 may include a notes-to-music synthesis, for providing an audio output of a written music passage. User 16 may be a music student, preparing to play a musical piece and assisted by listening to apparatus 10, as it produces an audio output of the written music, as will be described hereinbelow, in conjunction with FIG. 8.

Reference is now made to FIGS. 2A and 2B, which schematically illustrate internal and external structures, respectively, of hand-held device 12, in accordance with the present invention. Hand-held device 12 includes a body 21, preferably having an outer sheath, formed of a rigid material such as wood or plastic, having a proximal end 22 and a distal end 24, with respect to text 14, and a longitudinal axis L. Hand-held device 12 further includes a scanner 26, located at proximal end 22 and a computerized system 19. Scanner 26 is adapted for scanning a single line of text at a time. Preferably, user 16 scans text 14 in grammatical units such as a sentence, a clause, a phrase, or a word.

Additionally, hand-held device 12 may include a display drive 49 and a display panel 40 for providing communication between computerized system 19 and user 16. In essence, display panel 40 is equivalent to display screen 272 of FIG. 1A. Display panel 40 may be a touch panel, wherein user 16 may touch it with a soft tip (not shown) to activate certain features, or to respond to queries of computerized system 19. Additionally, device 12 may include at least one key 48, and preferably a plurality of keys 48, for supplementing the communication between computerized system 19 and user 16. Keys 48 may be used, for example, to specify a reading protocol, or to request a translation or rephrasing of a dictionary entry, when the reading protocol is based on a key request. Display panel 40 and keys 48 may have additional functions, as required.

Preferably, scanner 26 of hand-held device 12 includes an illumination system 28, for illuminating text 14, an optical system 34, for collecting and focusing light reflected from text 14, a photosensitive detector 25, preferably an array of CCD cells, for detecting the light collected and focused thereon by optical system 34, an analog amplifier 35, for amplifying the signals produced by photosensitive detector 25, and an analog-to-digital converter 37, for converting the amplified signals to digitized machine-readable data signals.

Illumination system 28 may be, for example, a fluorescent or incandescent lamp or an array of light emitting diodes (LEDs). Illumination system 28 may be arranged as substantially a point light source, or as a ring, surrounding optical system 34. In an embodiment of the present invention, light output and illumination angle are adjusted, for example, as taught by U.S. Pat. No. 5,996,895 to Heiman, et al, incorporated herein by reference. In an alternate embodiment of the present invention, a compact illumination system, for example, as taught by U.S. Pat. No. 6,033,086 to Bohn, incorporated herein by reference, is used. Preferably, the intensity of the illumination and the diameter of the illumination beam are controlled by knobs 27 and 29, respectively. Alternatively, the intensity of the illumination and the diameter of the illumination beam are controlled by at least one of keys 48, through computerized system 19, as will be described hereinbelow.

Optical system 34 may include a lens or a lens-and-mirror assembly. Optical system 34 defines an optical axis X, which may be parallel with longitudinal axis L, or arranged at an angle to it, depending on the specific arrangements of the other elements of device 12. For example, optical axis X may be perpendicular to longitudinal axis L, as taught by U.S. Pat. No. 5,767,494 to Matsueda, et al., incorporated herein by reference.

Preferably, optical system 34 has a focusing capability, for operation over a range of distances. Preferably, optical system 34 has an automatic focusing capability, in a manner similar, for example, to U.S. Pat. No. 5,841,121 to Koenck, incorporated herein by reference. Alternatively, user 16 may use a focusing ring 36 to bring an image of text 14, on photosensitive detector 25, into focus. Preferably, display panel 40 may be adapted for displaying text 14 as photosensitive detector 25 sees it, via at least one key 48, thus enabling user 16 to bring an image of text 14 into focus. In an alternative embodiment of the present invention, focusing is controlled by one of keys 48, through computerized system 19. In a further alternative embodiment of the present invention, optical system 34 is arranged as a fixed, free focus optical system, having a depth of field that maintains text 14 within focus for most applications.

Preferably, optical system 34 further includes a zooming capability, for operation over a range of print sizes of text 14. Preferably, user 16 may use a zooming ring 38 to zoom optical system 34 in and out, assisted by display panel 40. Alternatively, zooming may be performed automatically. Alternatively, zooming may be controlled by at least one of keys 48, through computerized system 19.

In an alternate embodiment of the present invention, optical system 34 is not used. Rather, photosensitive detector 25 includes a CIS array of photosensitive cells, arranged in close proximity to text 14, so as to catch the reflected light directly.

Computerized system 19 includes a processor 30, which preferably includes a control unit, a logic unit (ALU) and memory. Additionally, computerized system 19 may include a fixed data storage device 32, such as a hard disk.

Additionally, computerized system 19 includes an operating system, such as windows 95, windows 98, or windows 2000. Preferably, computerized system 19 further includes an object-oriented compiler, such as C++ or Java, which includes a linker for compiling an exec. file for several known applications. Alternatively, multithreading is used for running several applications in parallel.

Furthermore, computerized system 19 includes an OCR program of a first language and a text-to-speech synthesizer of the first language. Preferably, computerized system 19 further includes automatic translation software between the first language and a second language. Additionally in accordance with the present invention, computerized system 19 includes a dictionary in the first language, for rephrasing words or phrases in the first language to more common or more familiar words and phrases. Preferably, the applications are associated as necessary, for providing sequential outputs. Alternatively multithreading may be used for providing an audio output, in parallel with a visual display.

In some embodiments of the present invention, apparatus 10 may be adapted for automatic translation to more than one second languages, for example, from English to French and from English to Spanish. Computerized system 19 will include automatic translation software from English to each of the second languages. Additionally, apparatus 10 may be arranged as a two-way language-acquisition aide, for example, performing OCR conversion and text-to-speech synthesis in a first language and automatic translation to a second language, or OCR conversion and text-to-speech synthesis in the second language, and automatic translation to the first language. Thus, computerized system 19 may include more than one OCR programs, text-to-speech syntheses and automatic translation software. Furthermore, a combination of the above may be provided.

Additionally, OCR conversions and text-to-speech syntheses of different languages, dictionaries of these languages, pronunciation teaching software of these languages, and automatic translation software from these languages to other languages, as requested by the user, may be incorporated to computerized system 19. Preferably, when apparatus 10 is arranged to read more than one language, computerized system 19 recognizes a language it is arranged to read automatically.

In accordance with the present invention, a plurality of dictionaries may be provided, for example, a dictionary of the first language, a dictionary of the second language, a dictionary from the first language to the second, a dictionary from the second language to the first, and similarly, at least one dictionary of professional terms, and at least one dictionary of special idioms. Additionally, the user may augment and modify the dictionaries. The dictionaries may be used to support the automatic translation, or the rephrasing of difficult words. It will be appreciated that user 16 may add words to the dictionaries, where necessary.

Preferably, the dictionaries are in-context dictionaries, similar to dictionary 190, described hereinabove, in conjunction with FIGS. 1A-1F.

In accordance with the present invention, the user may specify the first and second languages from a library of first and second languages for which computerized system 19 is arranged. Additionally, computerized system 19 may be augmented for additional first and second languages.

Preferably, computerized system 19 is arranged to recognize printed matter of various fonts, as well as hand-written matter, in pen, pencil, and other writing instruments. Additionally, computerized system 19 may be arranged to recognize text on a display screen, such as a computer screen.

In accordance with the present invention, hand-held device 12 includes an audio-output system 17, which preferably includes a sound card 46, for producing the audio outputs, and may further include an amplifier 42, for amplifying the audio outputs, and a volume control knob 44, for controlling the volume of the audio outputs. Alternatively, the volume is controlled by at least one of keys 48, through computerized system 19. Audio output system 17 further includes an audio connector 45, for connecting cable 20 of earphones 18 to device 12.

In accordance with the present invention, keys 48 may be used to select a desired protocol from a library of at least one reading protocol.

Figure 3:
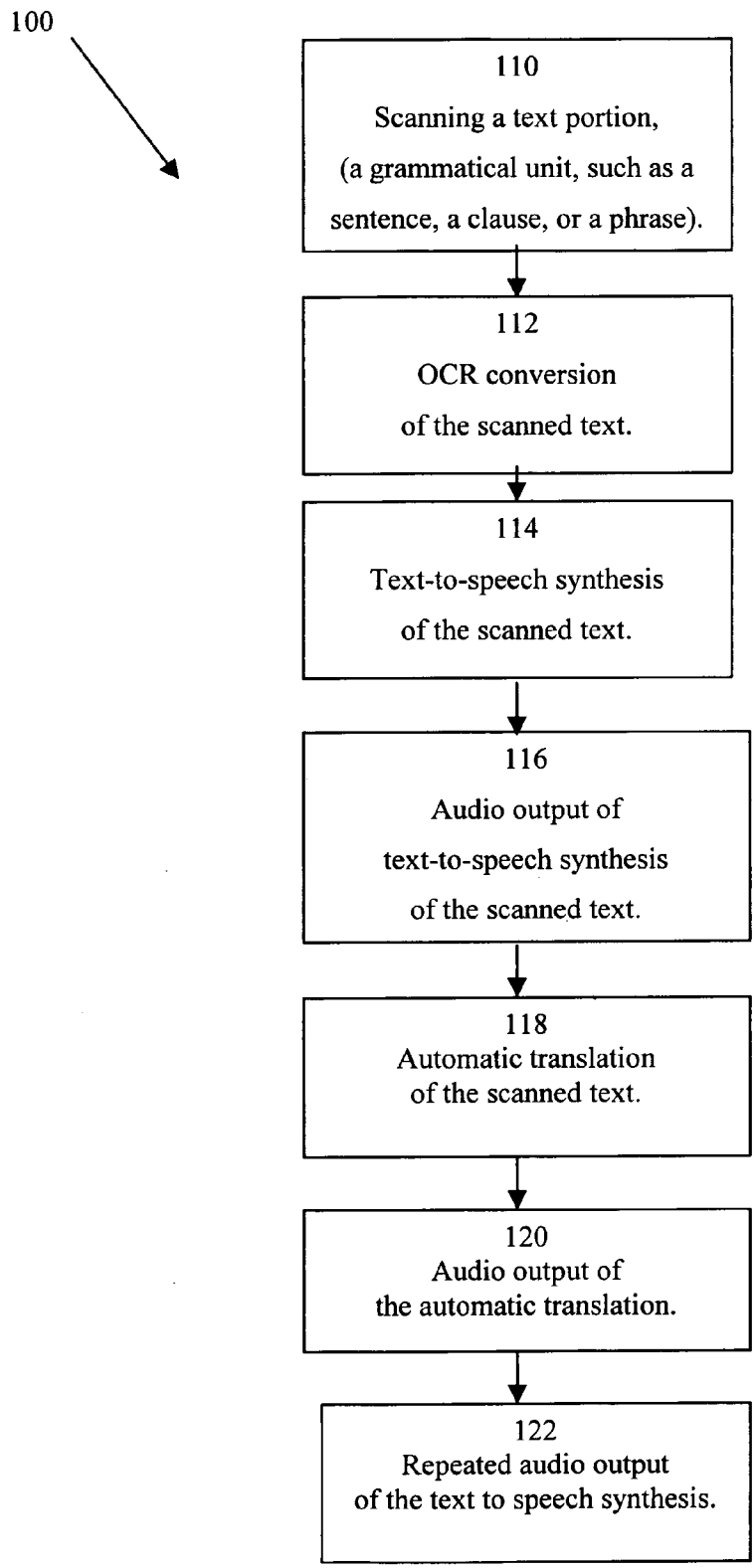
FIG. 3 is a flowchart of a first reading protocol, in accordance with the present invention.

Reference is now made to FIG. 3, which is a flowchart 100 of a first reading protocol using apparatus 10, in accordance with the present invention. The first reading protocol provides reading in the first language—the language of text 14, translation to a second language, and when desired, a repeat of the reading in the first language, as follows:

in a box 110, a portion of text is scanned by user 16, preferably, in grammatical units such as by sentence, by clause, or by phrase;

in a box 112, computerized system 19 performs OCR conversion to the scanned text portion;

in a box 114, computerized system 19 performs text-to-speech synthesis of the scanned text;

in a box 116, computerized system 19 provides an audio output of text-to-speech synthesis;

in a box 118, computerized system 19 performs automatic translation of the scanned text;

in a box 120, computerized system 19 provides an audio output of the automatic translation; and in a box 122, computerized system 19 repeats the audio output of the text-to-speech synthesis, if desired.

Figure 4:
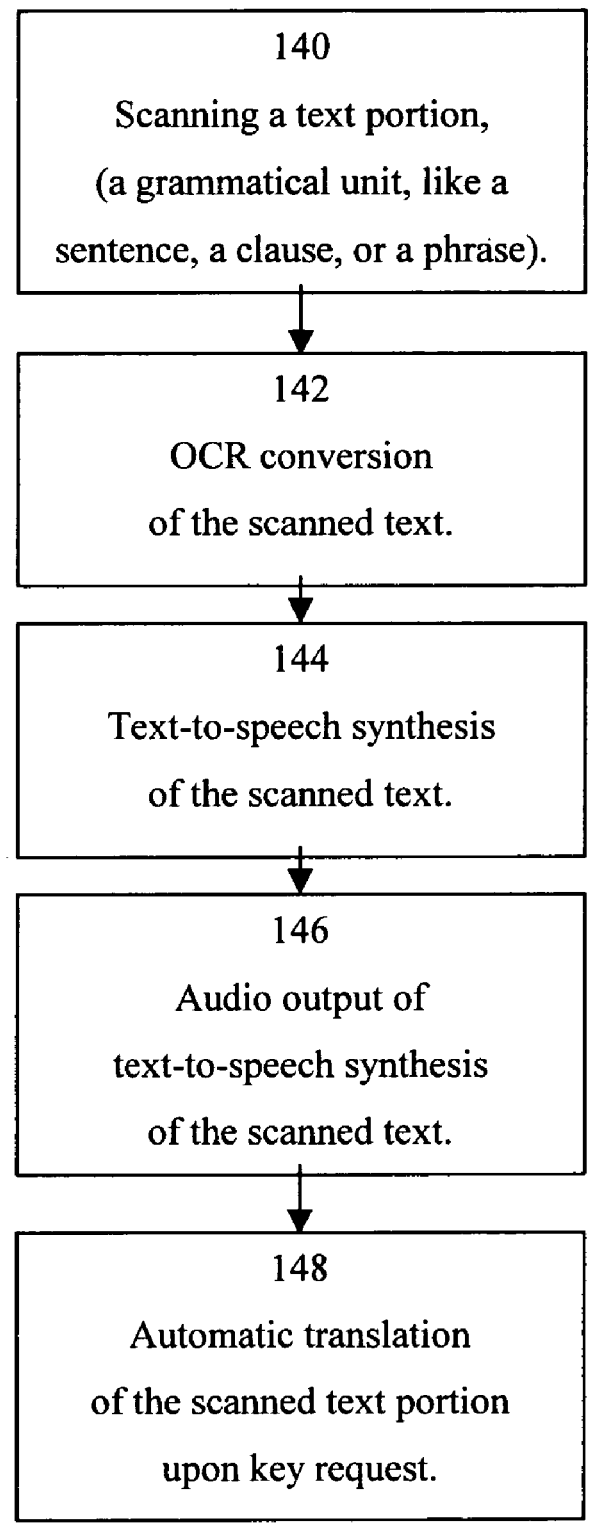
FIG. 4 is a flowchart of a second reading protocol, in accordance with the present invention.

Reference is now made to FIG. 4, which is a flowchart 130 of a second reading protocol, using apparatus 10, in accordance with the present invention. The second reading protocol provides reading in the language of text 14, and translation upon request, as follows:

in a box 140, a portion of text is scanned by user 16, preferably, in grammatical units such as by sentence, by clause, or by phrase;

in a box 142, computerized system 19 performs OCR conversion to the scanned text portion;

in a box 144, computerized system 19 performs text-to-speech synthesis of the scanned text;

in a box 146, computerized system 19 provides an audio output of the text-to-speech synthesis; and in a box 148, computerized system 19 performs automatic translation of the scanned text, when user 16 requests it, for example, with a stroke of at least one of keys 48.

Figure 5:
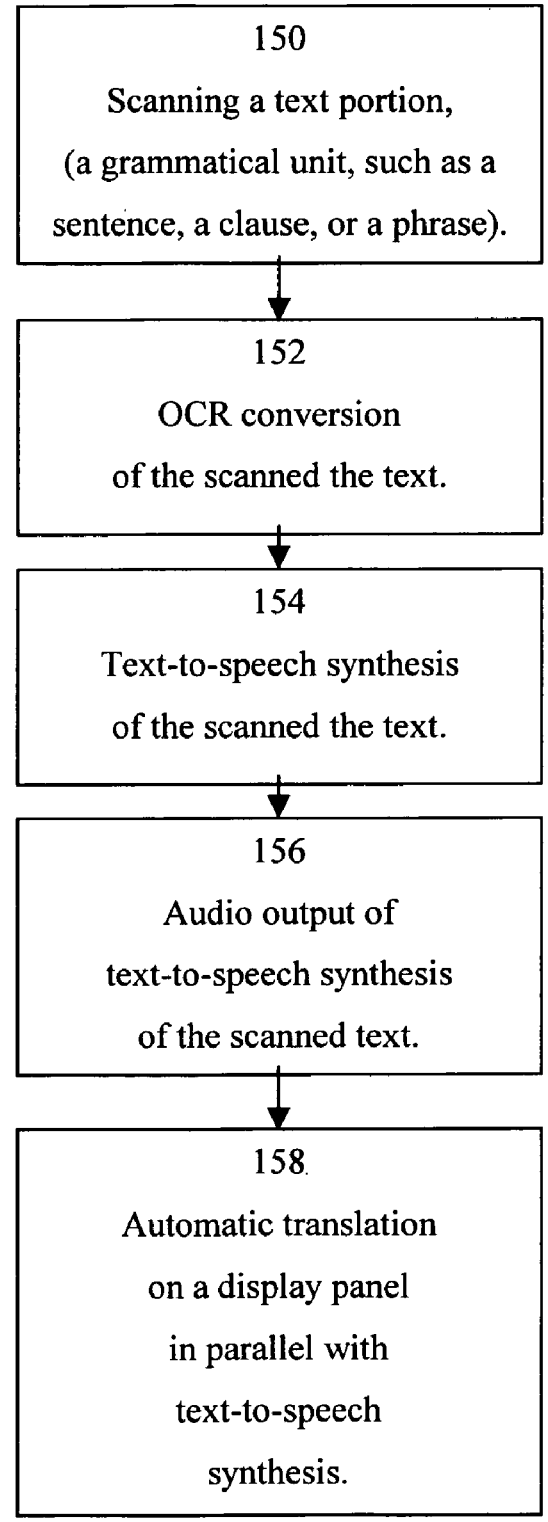
FIG. 5 is a flowchart of a third reading protocol, in accordance with the present invention.

Reference is now made to FIG. 5, which is a flowchart 160 of a third reading protocol, using apparatus 10, in accordance with the present invention. The third reading protocol provides reading in the language of text 14, and translation by display, using multithreading to run text-to-speech synthesis and automatic translation, in parallel, as follows:

in a box 150, a portion of text is scanned by user 16, preferably, in grammatical units such as by sentence, by clause, or by phrase;

in a box 152, computerized system 19 performs OCR conversion to the scanned text portion;

in a box 154, computerized system 19 performs text-to-speech synthesis of the scanned text;

in a box 156, computerized system 19 provides an audio output of the text-to-speech synthesis; and in a box 158, computerized system 19 performs automatic translation of the scanned text, in parallel with the text-to-speech synthesis, and displays the translation of display panel 40.

Figure 6A:
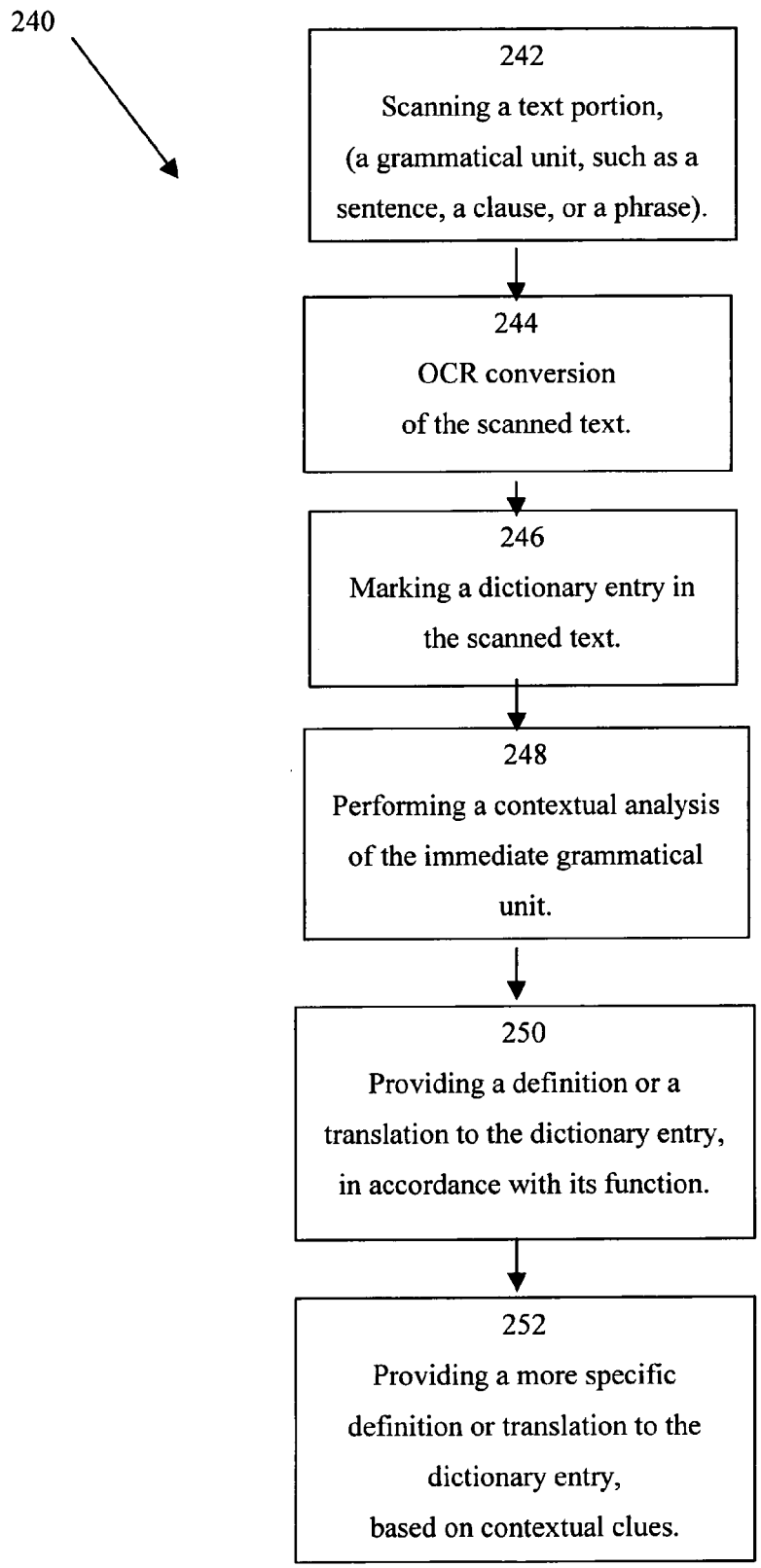
FIG. 6A is a flowchart of a fourth reading protocol, in accordance with the present invention.

Reference is now made to FIG. 6A, which is a flowchart of a fourth reading protocol 240, for merely presenting at least one definition or a translation in context, without other features, such as text-to-speech synthesis, or automatic translation, in accordance with the present invention.

in a box 242, a portion of text is scanned by user 16, preferably, in grammatical units such as by sentence, by clause, or by phrase;

in a box 244, computerized system 19 performs OCR conversion to the scanned text portion;

in a box 246, a dictionary entry of the scanned text is marked, wherein marking may take place by scanning the dictionary entry again, by selecting it on display panel 40, or by another feature, provided by apparatus 10;

in a box 248, computerized system 19 performs a contextual analysis of the portion of text;

in a box 250, computerized system 19 presents a definition or a translation to the dictionary entry, based on its function in the immediate grammatical unit within the portion of text, for example, as a verb;

in a box 252, computerized system 19 may further presents a more specific definition or translation to the dictionary entry, based on contextual clues.

Reference is now made to FIG. 6B, which is a flowchart of a fifth reading protocol 260, which is performed by computer 270 (FIG. 1G), and involves no scanning, in accordance with the present invention.

in a box 262, user 16 enters to computer 270 or marks on screen 272 a dictionary entry, embedded within a grammatical unit, as has been described hereinabove, in conjunction with FIGS. 1A-1F;

in a box 264, computer 270 performs a contextual analysis of the grammatical unit;

in a box 266, computer 270 provides a definition or a translation to the dictionary entry, based on the function in the grammatical unit, for example, as a verb;

in a box 268, computer 270 may further provide a more specific definition or translation to the dictionary entry, based on contextual clues.

Reference is now made to FIG. 7, which is a flowchart 190 of a sixth reading protocol, for teaching correct pronunciation using apparatus 10, in accordance with the present invention. Preferably, user 16 is a native speaker of the second language, eager to learn correct pronunciation of the language of text 14.

Often, when a person who was raised in a specific system of sounds and vowels moves into a different system of sounds and vowels, his difficulty is twofold: not only can he not pronounce the new sounds and vowels, but often, he does not hear their distinguishing features. For example, if an adult who was raised in a language system of six basic vowels moves into a language system of 12 or 20 vowels, then for a long time, he will only hear six basic vowels in the new language system.

The sixth reading protocol of apparatus 10 is designed to teach user 16 to hear and distinguish the sounds of the language system of text 14, and pronounce them correctly. Preferably, user 16 learns correct pronunciation through hearing his own pronunciation played back to him, by apparatus 10, and through comparing it with the text-to-speech synthesis. Alternatively, apparatus 10 may use a signal evaluator of computerized system 19 to compare the pronunciation of user 16 with its own text-to-speech synthesis, and to correct user 16, when necessary. Flowchart 190 of the sixth reading protocol includes the following steps:

in a box 170, a portion of text is scanned by user 16, preferably, in grammatical units such as by sentence, by clause, or by phrase;

in a box 172, computerized system 19 performs OCR conversion to the scanned text portion;

in a box 174, computerized system 19 performs text-to-speech synthesis of the scanned text;

in a box 176, computerized system 19 provides an audio output of the text-to-speech synthesis;

in a box 178, user 16 records his pronunciation of the portion of text;

in a box 180, computerized system 19 plays back the recorded speech of user 16;

in a box 182 computerized system 19 compares the recorded speech of user 16 with its own text-to-speech synthesis, possibly using a signal evaluator of computerized system 19;

in a box 184, computerized system 19 repeats its audio output of mispronounced words, and directs user 16 to try again; or in a box 186, computerized system 19 signals an approves the user's pronunciation.

Alternatively, in a box 184 apparatus 10 displays for the user the signal forms of its own text-to-speech synthesis and of the user's speech, for the user to compare.

In this manner, user 16 may practice his pronunciation on any text, including text that he may prepare, unlike known pronunciation systems, which rely on pronunciation practice of words and sentences preselected by the makers of the programs. For example, if user 16 is preparing to give a talk in a foreign language, he may practice his pronunciation beforehand.

Audio outputs of text-to-speech synthesis and automatic translation may be provided at different rates, such as a slow rate, a normal rate, and a fast rate, in a manner similar to the technology of Bell Labs Lucent Technologies, described hereinabove, in conjunction with the survey of prior art. Preferably, the user may select a desired rate, using at least one of keys 48.

Preferably, apparatus 10 includes a library of voices, stored for example in fixed data storage device 32. Audio outputs of text-to-speech synthesis and automatic translation may be provided in different voices, such as a man's voice, a woman's voice, or a child's voice. Additionally, audio outputs may be provided in specific voices, which a user may request, for example, in the voice of Burl Ives or in the voice of Whoopi Goldberg. Preferably, user 16 may select a desired voice, using at least one of keys 48.

Alternatively or alternatively, user 16 may train apparatus 10 to a desired voice, using for example, the technology of HMM-Based Trainable Speech Synthesis, which uses a set of decision-tree state-clustered Hidden Markov Models, described hereinabove, in conjunction with the survey of prior art.

Alternatively, user 16 may buy apparatus 10 with a specific voice.

In accordance with the present invention, apparatus 10 is further adapted for scanning written music, preferably with the accompanying tempo notations, cords, and other relevant information. Apparatus 10 is further arranged to produce an audio output of the written music, via a music synthesizer. Preferably, the music synthesizer may selectively produce the sound of a desired instrument, for example, a cello or organ. Preferably, at least one of keys 48 is used to select music synthesis as well as a synthesizer sound. Preferably, user 16 maintains visual contact with the written music, as it is produced, for example, in preparation for playing it.

Figure 8:
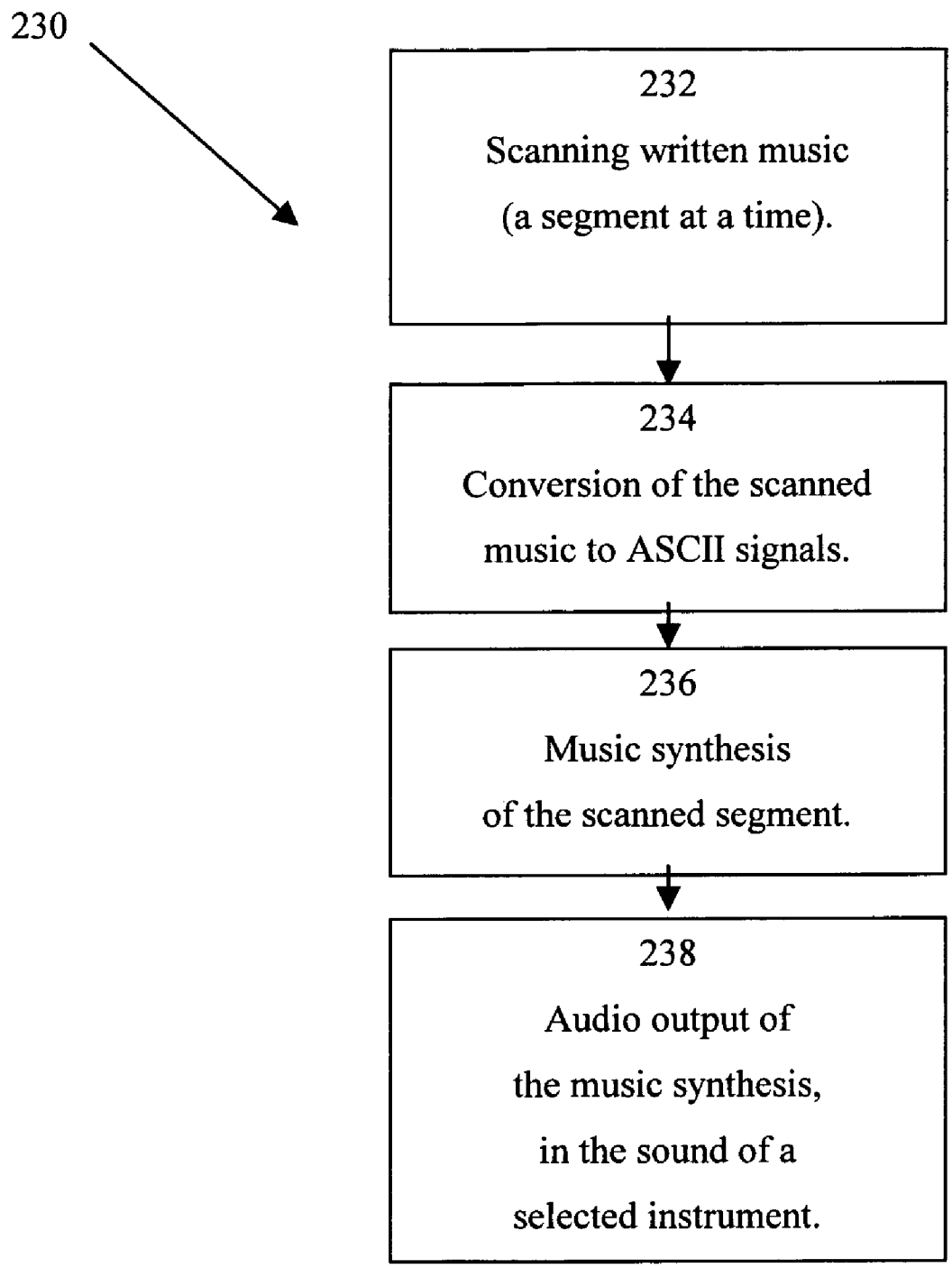
FIG. 8 is a flowchart of a protocol for music synthesis, in accordance with the present invention.

Reference is now made to FIG. 8, which is a flowchart 230 of a protocol for using apparatus 10 as a music synthesizer, in accordance with the present invention, as follows:

in a box 232, a section of written music, which may include music notes in a specific key, accompanying cords, tempo and other relevant information is scanned by user 16, preferably in sections of musical passages;

in a box 234, computerized system 19 performs OCR conversion to the scanned section of written music;

in a box 236, computerized system 19 performs a music synthesis of the scanned section, preferably including a synthesis of cords, tempo and other musical information; and in a box 238, computerized system 19 provides an audio output of the scanned section, preferably, in the sound of a selected instrument, for example, a piano or a flute. Additionally, a combination of instrumental sounds may be used, for example, a piano and a guitar, or a piano, a saxophone, and a trumpet.

Reference is again made to FIGS. 1J, 2A and 2B, in order to illustrate additional features of apparatus 10, in accordance with the present invention. Preferably, hand-held device 12 includes a pen 64, having a writing tip 65, located in a channel 66. Pen 64 may be selectively deployed and retracted by a slide 68 in a slit 70. Pen 64 may be used for marking up text 14, or for adding comments to text 14 by user 16, as he sees fit. Preferably, writing tip 65 is a conventional, easily obtained writing tip, for example, a graphite rod in a conventional size. In an alternate embodiment, pen 64 may be external to body 21. Preferably, apparatus 10 is further arranged to read the writing of its own writing tip 65, when desired.

Additionally, in accordance with the present invention, hand-held device 12 includes a storing component 76, adapted for receiving a removable data storage component 74 such as a diskette, a CD, a minidisk, a cassette tape, or a similar lightweight data storage component, for storing information that was scanned, translated or otherwise produced by computerized system 19. Preferably, components 76 and 74 are miniature, and may be tailor fitted for device 12. User 16 may use microphone 15 to record other messages, which he would like stored with the text, on removable data storage component 74.

Further in accordance with the present invention, hand-held device 12 may include a connector 72 for connecting it to a desktop computer, a laptop computer, a palmtop, a notebook, a mobile telephone, an organizer, and other computerized devices, when desired.

Additionally or alternatively, hand-held device 12 may be arranged as an integral unit with another hand-held computerized device such as a palmtop, a CD player, a cassette player, a mobile telephone, a radio, an organizer, and other computerized devices.

Additionally, in accordance with the present invention, hand-held device 12 may include a clock 84, to help user 16 pace himself.

Further in accordance with the present invention, hand-held device includes a rechargeable battery 50, fitted onto body 21 through a battery fitting 52. Additionally or alternatively, hand-held device 12 may be connected to the grid, via a power connector 54 and an electric cable (not shown).

Preferably, hand-held device 12 includes an on/off switch 60, to selectively turns apparatus 10 on and off. Preferably, apparatus 10 automatically shuts itself off after a predetermined length of time in which it is not used, for example, 3 or 5 minutes. Alternatively, hand-held device 12 includes a heat-sensor 57, in communication with computerized system 19, for automatically turning apparatus 10 on, when it is hand-held, and for automatically shutting apparatus 10 off, when it is laid down. Alternatively, another known system for automatically turning apparatus 10 on and off may be used.

Preferably, hand-held device 12 includes a gyroscope 86, adapted for gliding across text 14. Gyroscope 86 is in communication with computerized system 19, and informs computerized system 19 when the scanning of a portion of text 14, such as a sentence, has been completed, and OCR conversion should be performed. Alternatively, gyroscope 86 is not used, and computerized system 19 determines when the scanning of a portion of text has been completed, by discerning a pause in the inflow of scanned information. Gyroscope 86 may also be used to automatically turn apparatus 10 on, when it begins to glide across text 14, and to automatically shut apparatus 10 off, when it is not being used for a predetermined length of time.

Alternatively or additionally, a wheel 86, in communication with a counter that counts each revolution, may be used, in place of gyroscope 86. The number of revolutions may be indicative of a length that has been scanned.

Preferably, body 21 of hand-held device 12 may be opened by unscrewing screws 58, that fit into screw holes 62, for repair or for the installation or replacement of hardware.

In accordance with some embodiments of the present invention, device 12 is held at an oblique angle to text 14, in order to enable user 16 to maintain visual contact with text 14. Preferably, scanning at an oblique angle is achieved through any of the methods taught by U.S. Pat. No. 5,019,699 to Koenck and U.S. Pat. No. 5,834,749 to Durbin, both incorporated herein by reference and described hereinabove, in conjunction with the survey of prior art.

In accordance with the present invention, device 12 is arranged so that the oblique angle at which it is held with respect to text 14 may be varied, to suit user 16. Preferably, correction for the variation in the oblique angle may be performed by computerized system 19, for example, as taught by Koenck and Durbin. Alternatively, photosensitive detector 25 is arranged on a hinge 82 and may be selectively swung to a certain degree to the left or to the right, by moving a notch 78 in a semicircular slit 80. Preferably, photosensitive detector 25 is thus maintained parallel to text 14, regardless of the angle at which device 12 is held with respect to text 14.

However, device 12 may be held so that optical axis X is perpendicular to text 14, without interfering with the ability of user 16 to maintain eye contact with text 14 as it is read aloud by apparatus 10. Since the text-to-speech synthesis is performed after scanning, user 16 may first scan the text, than listen to the text-to-speech synthesis and follow the text with his eyes.

Figure 9A:
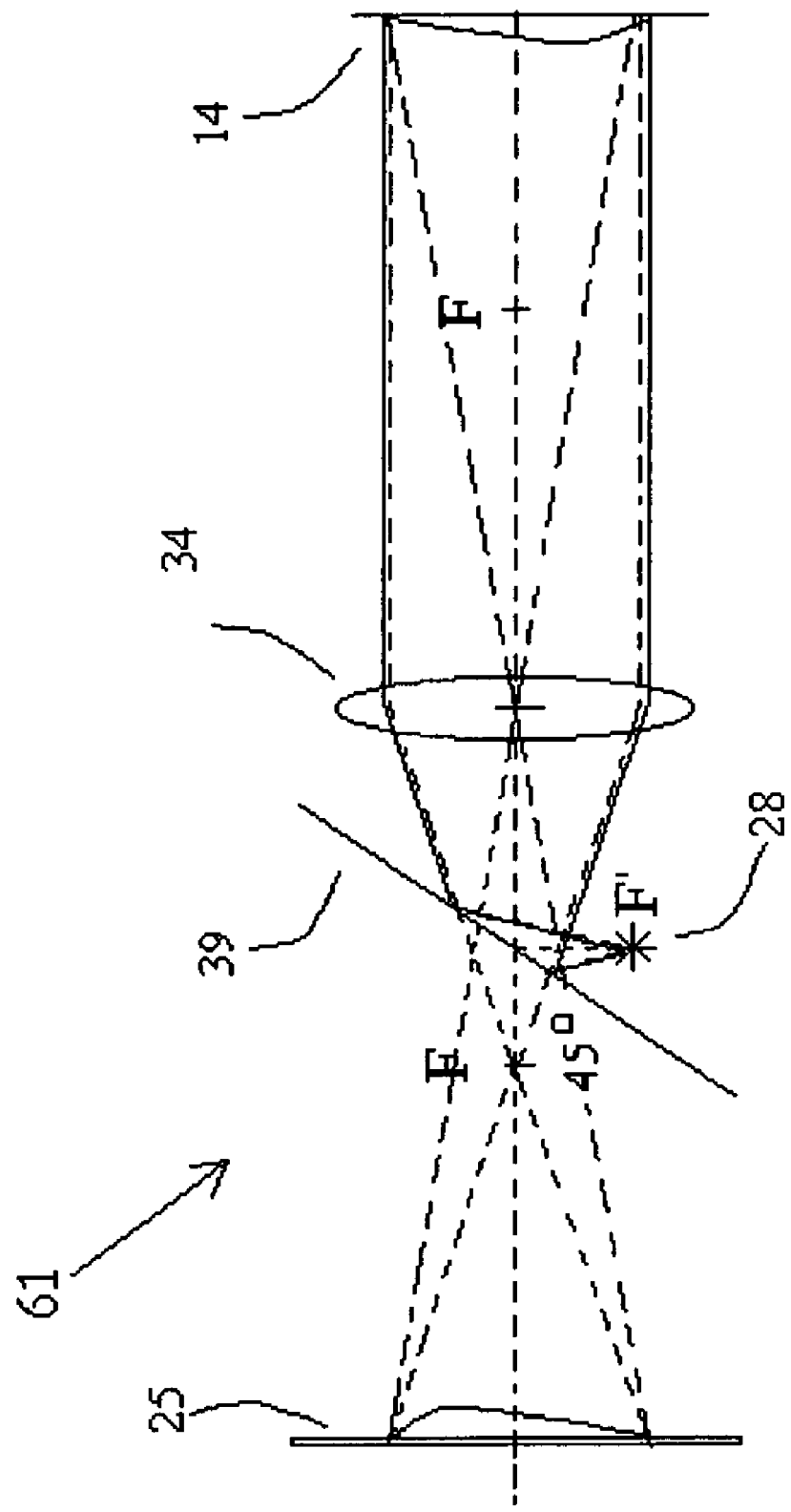

Reference is now made to FIG. 9A, which schematically illustrates a scanner 61, in accordance with the present invention, as taught by U.S. Pat. No. 5,200,793, to Ulich et al., and by U.S. Pat. Nos. 6,057,909, 6,091,905, and 6,100,517 to Yahav et al., incorporated herein by reference. Illumination system 28 includes a substantially point light source, arranged behind optical system 34, at a distance from the optical system F', which is substantially equal to the focal distance, F, but off optical axis X, wherein light is bore-sighted with optical axis X with a beam-splitter 39, for producing collimated, even illumination of text 14.

Reference is now made to FIG. 9B, which schematically illustrates a scanner 63, in accordance with another embodiment of the present invention, as taught by Yahav et al. Illumination system 28 includes an area light source whose dimensions are substantially the same as those of photosensitive detector 25, arranged behind optical system 34, at a distance from optical system 34 which is substantially equal to the distance between optical system 34 and photosensitive detector 25, but off optical axis X, wherein light is bore-sighted with optical axis X with beam-splitter 39, for producing a field of illumination which is substantially equal to the field of view. Alternatively, area light source 28 may be of dimensions smaller than those of photosensitive detector 25, but closer to optical system 34, or of dimensions greater than those of photosensitive detector 25, but farther away from optical system 34, while maintaining the condition that the field of view is substantially, or generally the same as the field of illumination. The advantage of this arrangement is that user 16 may easily control the field of view, by varying the field of illumination, which is visible to him.

Reference is now made to FIG. 9C, which schematically illustrates a scanner 65, in accordance with still another embodiment of the present invention. User 16 views text 14 through beamsplitter 39, wherein half the reflected illumination reaches user 16 and half is directed to optical system 34 and photosensitive array 25. Alternatively, no optical system is used, and half the reflected illumination reaches user 16 and half is directed to photosensitive array 25, formed as a CIS array.

Preferably hand-held device 12 is pen-like so as to fit comfortably in a hand. Alternatively, another preferably ergonomic design may be used. Preferably, earphones 18 are lightweight so as not to cause a strain on the wearer.

Figure 10B:
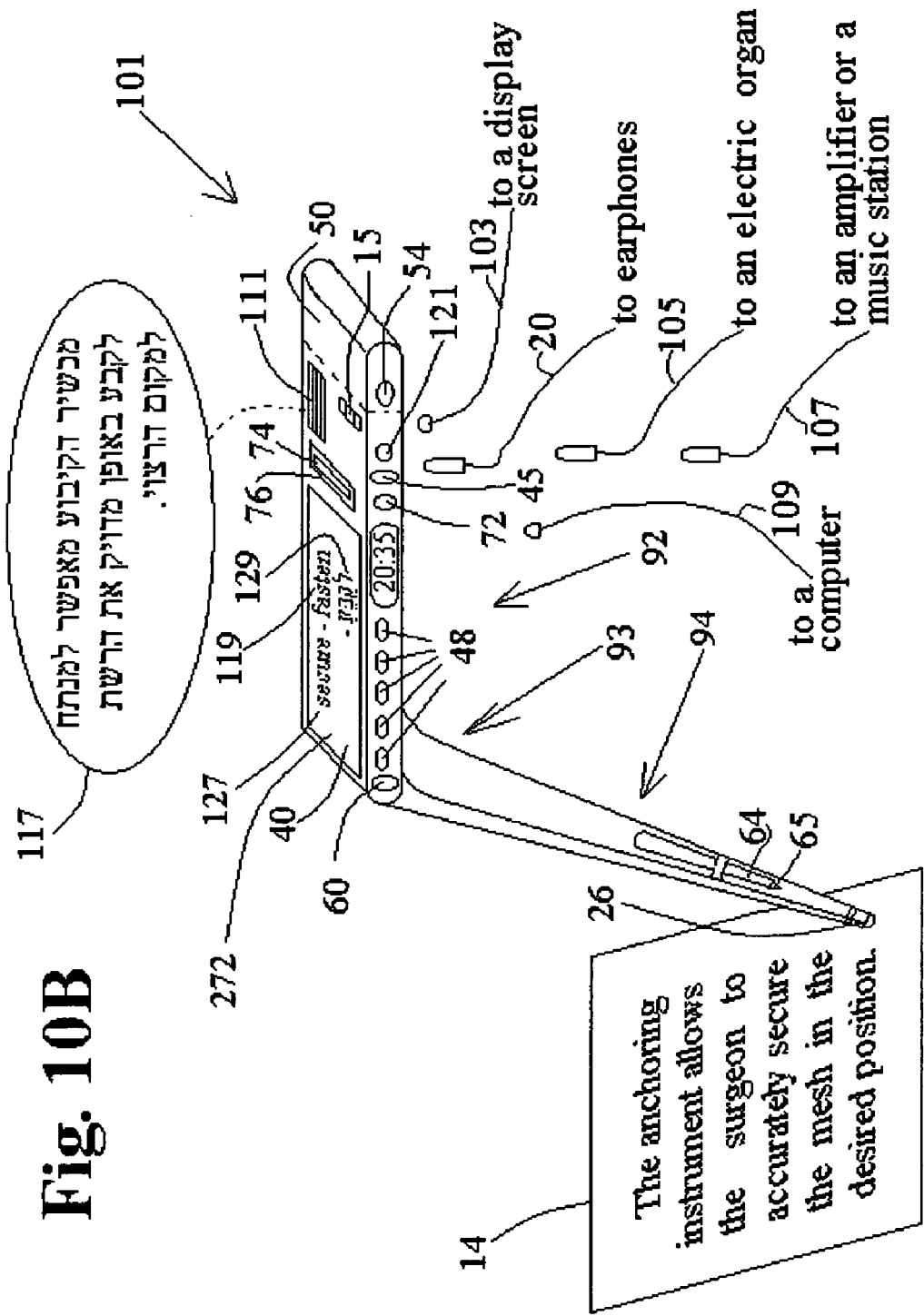

Reference is now made to FIGS. 10A and 10B, which schematically illustrate a stand-alone, hand-held, computerized scanning apparatus 101, in accordance with another embodiment of the present invention. Apparatus 101 includes a first portion 94, which is pen-like, and a second portion 92, which is generally horizontal over the hand holding first portion 94 and which includes display panel 40 (analogous to display screen 272 of FIGS. 1A-1J), keys 48 and on/off switch 60. In this way, user 16 has a better view of display panel 40, as he scans text 14. Preferably, apparatus 101 further includes a flexible portion 93, formed for example, of resilient plastic, for allowing first and second portions 94 and 92 to fold against each other, so apparatus 101 can be easily inserted into a pocket. Alternatively, another folding means may be provided, for example, a hinge.

Apparatus 101 may include a built-in microphone 15, and a built-in speaker 111, which may be used in place of headgear 13.

Additionally audio connector 45, may be used for connecting cable 20 to earphones 18, a cable 105 to an electric organ, or a cable 107 to an amplifier, a music station, a tape deck, a CD player, or a mobile phone.

Furthermore, apparatus 101 preferably includes a video connector 121, for connecting apparatus 101 to an external display screen, such as a computer display screen, a television, or an oscilloscope via a cable 103.

Additionally or alternatively, connector 121 may be computer connector, for example, a USB connector.

Apparatus 101 may be arranged to display text 14, as it is scanned, for example, for use in a classroom. Text 14 may be in Hebrew, as shown by a portion of text 14A, or in English, as shown by a portion of text 14B. Additionally or alternatively, it may be in any other language.

Additionally, or alternatively, apparatus 101 may be adapted for reading a portion of music notes 95. Portion of music notes 95 may include music symbols as known, such as a key 113, a beat 115, accompanying cords 97, a playing direction 91, and notes 99.

As seen in FIG. 10B, apparatus 101 is adapted to scan portion of text 14 in the first language, such as English, and produce an automatic translation 117, for example, audibly, via built-in speaker 111, or via earphones 18 (FIG. 1J).

Thus, text 14, "The anchoring element allows the surgeon to accurately secure the mesh in the desired position" may be audibly produced as a syntactically correct sentence in a second language, for example, Hebrew, as automatic translation 117.

Additionally, a definition in context 119, for a dictionary entry 127 of portion of text 14, for example, to the word "secure" may be displayed on display panel 40 (display screen 272 of FIG. 1A). Thus, although, the American Heritage Dictionary, for example, defines "secure" first as an adjective, and second, as a transitive verb, and although, as a transitive verb, the first definition is "guard from danger," and only the second definition is fasten, apparatus 101 offers in display panel 40 the transitive verb definition, and preferably, the appropriate transitive verb definition, "fasten." Additionally, a translation in context 129 may be provided.

The contextual clue from the immediate grammatical unit, in the present example, may be provided by word association between the words "anchor" and "secure," as has been described hereinabove, in conjunction with FIG. 1B.

Furthermore, apparatus 101 may include a connector 72 for connecting it to any of a desktop computer, a laptop, a palmtop, a mobile telephone, an organizer, and other computerized devices, via a cable 109, when desired.

Reference is now made to FIG. 11, which schematically illustrates a stand-alone, hand-held, computerized scanning apparatus 131, in accordance with still another embodiment of the present invention. Apparatus 131 is similar in design to apparatus 101, but its second portion 92 is arranged to be worn around the wrist of user 16 with a wristband 125. The purpose of wristband 125 is to reduce the weight that is carried by the hand of user 16 as he scans a portion of text.

Apparatus 101 and 131 may be used with FIGS. 3-8, in a manner similar to apparatus 10.

As has been noted hereinabove, in conjunction with FIG. 2B, preferably, optical system 34 includes focusing and zooming capabilities, to increase the accuracy of the scanning.

A spell check may be employed on the scanned text, to identify and possibly also correct words that may have been scanned incorrectly. The spell check may interact with user 16 before correcting any scanning errors.

Additionally or alternatively, an image processing software may be employed, to identify and possibly also correct words that may have been scanned incorrectly. The image processing software may also interact with user 16 before correcting any scanning errors.

Returning now to contextual analysis, Reference is made to FIGS. 12A-12B, presented as tables and illustrating the manner of breaking down a grammatical unit into functions, for contextual analysis, in accordance with the present invention.

Preferably, a fractal-like approach to contextual analysis of a grammatical unit is applied, by breaking down a grammatical unit to major functional components, formed of simple sentences, clauses and phrases, and breaking down each major functional component to smaller components, until all the components are at a dictionary-entry level.

As seen in FIG. 12A, contextual analysis, in accordance with the present invention, includes:

i. breaking down a grammatical unit 340 "The local ski resort was opened to visitors on Saturday morning" to major functional components 342, 344, 346, 348, and 350; and ii characterizing major functional components 342, 344, 346, 348, and 350, according to their respective functions 352, 354, 356, 358, and 360, for example, characterizing, major functional component 342, "The local ski resort" as noun phrase 352, forming the subject, and characterizing major functional component 344, "was opened" as verb phrase 354, forming the predicate.

As seen in FIG. 12B, contextual analysis, in accordance with the present invention, further includes:

i. breaking down major functional component 342, "The local ski resort" to basic functional components 362, 364, 366, and 368, of a dictionary-entry level;

ii. characterizing basic functional components 362, 364, 366, and 368, by their respective functions 372, 374, 376, and 378, for example, characterizing basic functional component 362, "the" as article 372, and characterizing basic functional component 364, "local" as first adjective 374;

iii. further characterizing basic functional components 362, 364, 366, and 368, by their respective attributes 382, 384, 386, and 388, for example, characterizing basic functional component 362, "the" by attribute 382—definite, characterizing basic functional component 364, "local" by attribute 384—adjective form, characterizing basic functional component 366, "ski" by attribute 386 attributive-noun form, and characterizing basic functional component 368, "resort" by attribute 388—tangible, inanimate, singular. The purpose of the attributes is to provide as many contextual clues as possible.

Reference is made to FIGS. 12C-12D, presented as tables and illustrating basic structures of sample grammatical units, for contextual analysis, in accordance with the present invention.

As seen in FIG. 12C, a general adverbial-phrase template 390 may be constructed, which may apply to a large number of adverbial phrases. The general template may include for example:

preposition—article—adjective phrases(s)—noun—prepositional phrase.

To fall into this category, portions of template 390 may remain unoccupied, provided the phrase begins with a preposition and contains a dictionary entry, which functions as a noun. The present template encompasses many different adverbial phrases, for example, "By the river," "After dinner," "By his wisdom," "With some luck," "In a minute," "With a piercingly loud and screeching scream," "By the rivers of Babylon," and "In consequence of my smoking." General template 390 may be used for the contextual analysis, as illustrated in conjunction with FIG. 1A, hereinabove, for the determination of the functions of dictionary entries in a grammatical unit that falls within template 390.

It will be appreciated that template 390 may be used as a contextual clue. For example, since "In consequence of my smoking," falls within it, one may determine that "smoking" functions as a noun.

FIG. 12C further illustrates the fractal-like approach to the contextual analysis, by breaking down the grammatical unit to major functional components, and breaking down each major functional component to smaller components. In the present example, "piercingly loud and screeching scream" is defined simply as an adjective phrase, that may be broken down at a later stage.

It will be appreciated that general templates may also be constructed for other forms of adverbial phrases, for example, for the participial phrase, such as "walking down the street," "singing to my baby," and "coming home from work."

As seen in FIG. 12D, a general imperative-sentence template 392 may be constructed, which may apply to a large number of imperative sentences. General imperative-sentence template 392 may include for example:

imperative verb—preposition—article—adjective phrase (s)—noun phrase

To fall into this category, portions of template 392 may remain unoccupied, provided the sentence begins an imperative verb. The present template encompasses many different imperative sentences, for example, "Fast forward a decade," "Return to sender," "Write down your great ideas about your book," "Bring in your friend," and "Go!"

General template 392 may be used for the contextual analysis, as illustrated in conjunction with FIG. 1A, hereinabove, for the determination of the functions of dictionary entries in a grammatical unit that falls within it.

It will be appreciated that other general templates, which may be more general still, may similarly be used.

Reference is now made to FIGS. 13A-13E, presented as tables representing a partial listing of functions and attributes, which may be of help, when performing contextual analysis, in accordance with the present invention. It will be appreciated that FIGS. 13A-13E serve as examples of the types of attributes that may be considered.

Preferably, the attributes are divided by level. For example, at a first level, nouns may be divided to intangible and tangible. At a lower level, intangible nouns may be divided to abstract nouns and nouns representing actions. At a lower level still, nouns representing actions may be further divided to active and passive actions. Other attributes for nouns may include, human, animal, vegetable, inanimate, time, as well as singular, plural, male, and female.

The following are examples of the manner of using the attributes of FIGS. 13A-13E for contextual analysis:
  i. to order a noun (human) generally means to command the noun (human);
  ii. to order a noun (inanimate) generally means to request that the noun (inanimate) be delivered;
  iii. to order a noun (inanimate) preposition (from) generally means to request that the noun (inanimate) be delivered from a specific place; and
  iv. to order a noun (inanimate) preposition (in) generally means to request that the noun (inanimate) be put in a specific order.

Reference is now made to FIG. 14, representing a segment of an exposure basis 430, in accordance with the present invention. Exposure basis 430 is founded on the idea that language formulation is generally a matter of memory and exposure, rather than of logical creations. Therefore, a database of acceptable forms and expressions, in any particular language, is required.

Preferably, exposure basis 430 is constructed at least as a first-language exposure basis 440, formed as a very large collection of written material, such as books, journals, papers, patents, newspapers, movie scripts, and the like, for providing an exposure database for the first language.

First-language exposure basis 440 may be used both for contextual analysis of existing grammatical units, and for the generation of new grammatical units, when writing in the language, or when translating to the language of exposure basis 440. First-language exposure basis 440 may be used by individuals, preferably with the help of a computerized device, or automatically, by computerized devices.

Preferably, first-language exposure basis 440 is formed of material already available in a soft format, and may be further available on the web. It will be appreciated that first-language exposure basis 440 need not be stored at a single place; rather links or addresses may be provided to various articles and other textual matter, which may remain stored at its original address.

Preferably, first-language exposure basis 440 may attempt to reconstruct at least several months of language exposure, preferably, of a high school or college student, and may further reconstruct several years of language exposure.

Additionally, first-language exposure basis 440 may be subdivided according to fields, for example, literature, science, engineering, law.

Furthermore, first-language exposure basis 440 may be subdivided according to periods, for example, $20^{th}$ century, Victorian period, and the like.

Moreover, first-language exposure basis 440 may be subdivided according to age group, for example, teenage, college age, adult, and the like.

It will be appreciated that first-language exposure basis 440 may be subdivided according to other language styles.

Some examples of the use of first-language exposure basis 440 are as follows:
1. For contextual analyses of the sentence, when the functions of the word is not obvious, for example, as in "High health care costs result in poor health care availability." First-language exposure basis 440 may be searched for the followings:
    i. Does "result" as a noun in singular generally appear in exposure basis 440 preceded by an article? Some nouns do not, for example, "peace," or "apparatus." Yet, the contextual analysis of the present example, hereinabove, in conjunction with FIG. 1A, was based on the absence of the article, and would be accurate if an article is indeed required for the noun form.
    ii. Does "result" as a noun appear in exposure basis 440 followed by the preposition "in"? Some nouns do, for example, "success," or "order." Yet, the contextual analysis of the present example, hereinabove, in conjunction with FIG. 1A, was further based on the association of "result" as a noun with the preposition "of," and would be accurate if that indeed is found to be the case.
    iii. Does the word combination "costs" as a verb followed by "result" as a noun appear in first-language exposure basis 440. If not, then "costs" is probably not the predicate of the present example.
2. When writing in or translating to the language of exposure basis 440, it may be searched for proper usage, for example, to determine the proper use of prepositions:
    i. Is it "He looked at the window," or "He looked on the window"?
    ii. Is it "He is angry with his friend," or "He is angry about his friend"?
    iii. Is it "It relates to the study," or "It relates with the study"?
3. Additionally, when writing in or translating to the language of exposure basis 440, it may be searched for proper usage, for example, to identify specific expressions not common to other languages, such as:
    i. to fall asleep; and
    ii. to take a photograph.
4. Furthermore, when writing in or translating to the language of exposure basis 440, it may be searched for proper usage, for example, when translating a specific term from another language, such as,
    i. Literally, "ski's resort," which is a literal translation from Hebrew.
    ii. Literally, "a resort of ski," which is a literal translation from French.

By searching first-language exposure basis 440 both for "a ski's resort" and "a resort of ski" one may discover, that in English, the more common expression is "a ski resort," with "ski" as an attributive noun.

In accordance with the present invention, exposure basis 430 (FIG. 14) further includes a second-language exposure basis 450, constructed similarly to first-language exposure basis 440, and similarly formed as a very large collection of written material, such as books, journals, papers, patents, newspapers, movie scripts, and the like, for providing an exposure database for the second language. second-language exposure basis 450 may also be subdivided according to fields, for example, literature, science, engineering, law, according to periods, for example, $20^{th}$ century, Victorian period, and the like, according to age group, for example, teenage, college age, adult, and the like, or according to other language styles.

In accordance with the present invention, portions of, or all of second-language exposure basis 450 may be translations of portions of, or all of first-language exposure basis 440, as seen in FIG. 14. Preferably, a manual translation or an automatic translation, which preferably has been verified, is used, so as to represent correct usage, in the translation.

Similarly, portions of first-language exposure basis 440 may be translated from second-language exposure basis 450, preferably, manually, or with verification.

It will be appreciated that first-language exposure basis 440 and second-language exposure basis 450 may be largely based on material that has already been translated manually, for example, the Bible, Shakespearian plays, Jane Austin books, Harry Potter books, Douglas Adams books, Amos Oz books, newspapers, National Geographic magazines and the like.

It will be further appreciated that when corresponding material is available in more than one language, the correspondence is maintained in exposure basis 430, as shown in FIG. 14, to derive the utmost from that correspondence.

The correspondence may provide changes in the translation, beyond a literal translation, for example:

1. Literally, "He looked on the window" in Hebrew should be translated to literally, "He looked at the window," in English.
2. Literally, "Ski's resort" in Hebrew should be translated to literally, "A ski resort," in English.
3. Literally, "A resort of ski" in French should be translated to literally, "A ski resort," in English.
4. Literally," to photograph" in Hebrew should be translated to literally, "to take a photograph," in English.

It will be appreciated that exposure basis 430 may further include other languages and translations to other languages.

It will be appreciated that exposure basis 430 may be constructed as a web site. Additionally or alternatively, it may be constructed on a diskette, a CD, a minidisk, or the like.

In accordance with the present invention, exposure basis 430 may be broken down to grammatical units, each analyzed for its function, as has been illustrated hereinabove, in conjunction with FIGS. 12A and 12B. In this way, the function and attributes of each dictionary entry in exposure basis 430 may be noted.

Reference is now made to FIGS. 15A-15C, which schematically illustrate the manner of breaking down grammatical units of exposure basis 430 to functional templates, specific to a language, and comparing the functional templates of different languages, in accordance with the present invention.

It will be recalled that a contextual analysis relates at least to an analysis of the function of each dictionary entry in a given grammatical unit. For example, a contextual analysis of "The girl dances beautifully," relates at least to the following analysis: The—article; girl—noun; dances—verb; beautifully—adverb. The functional template of the above sentence is defined as the functional order of the words in the sentence, in the present example: Article; noun; verb; adverb.

The functional templates of the different languages may show differences in usage, specific to each language, and how these usages are converted from one language to another. For example, attributive nouns, such as "city lights" may be unique to English. In other languages, prepositional phrases, for example, "lights of the city" may be used.

As seen in FIG. 15A, a grammatical unit 442, from first-language exposure basis 440, is broken down to a first-language functional template 444 of basic functional components, and compared with a second-language functional template 454 of basic functional components, of a corresponding grammatical unit 452 from second-language exposure basis 450.

As seen in FIG. 15B, grammatical unit 442, from first-language exposure basis 440, is broken down to first-language functional template 444 of basic functional components, and compared with a third-language functional template 464 of basic functional components, of a corresponding grammatical unit 462 from a third-language exposure basis.

It will be noted that where a correspondence exists between two grammatical units in a first and a second languages, and between two grammatical units in the first and a third languages, then a correspondence may be obtained, indirectly, between the two grammatical units in the second and the third languages.

This indirect correspondence is illustrated in FIG. 15C, between grammatical unit 452, from second-language exposure basis 450 and grammatical unit 462 from a third-language exposure basis.

It will be appreciated that the functional templates need not be used, and grammatical unit 442, 452 and 462 may be compared directly, for example, 442 vis a vis 452, 442 vis a vis 462, and 452 vis a vis 462.

Figure 16:
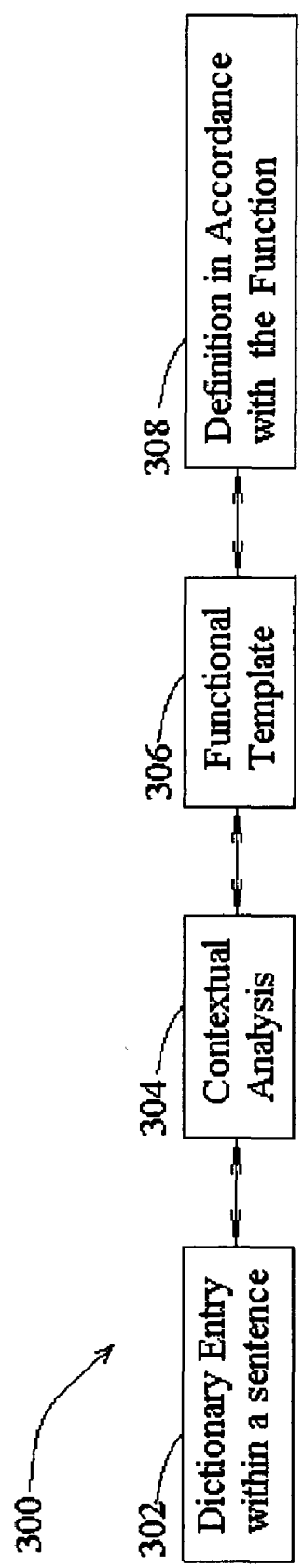
FIG. 16 schematically illustrates, in a flowchart form, a method of performing contextual analysis, using a functional template, in accordance with the present invention.

Reference is now made to FIG. 16, which schematically illustrates, in a flowchart form, a method 300 of performing contextual analysis, using a functional template, in accordance with the present invention. Method 300 includes, in a box 302, selecting a dictionary entry, embedded within a sentence, or another grammatical unit;

in a box 304, performing a contextual analysis on the sentence;

in a box 306, determining the functional template for the sentence or the grammatical unit, based on the contextual analysis; and in a box 308, providing a definition for the dictionary entry, in accordance with its function.

It will be appreciated that determining the functional template for the whole sentence or grammatical unit may be necessary to ensure that the contextual analysis is reasonable, for example, that the sentence in question indeed contains a subject and a predicate, and is not formed only of adjectives.

Figure 17A:
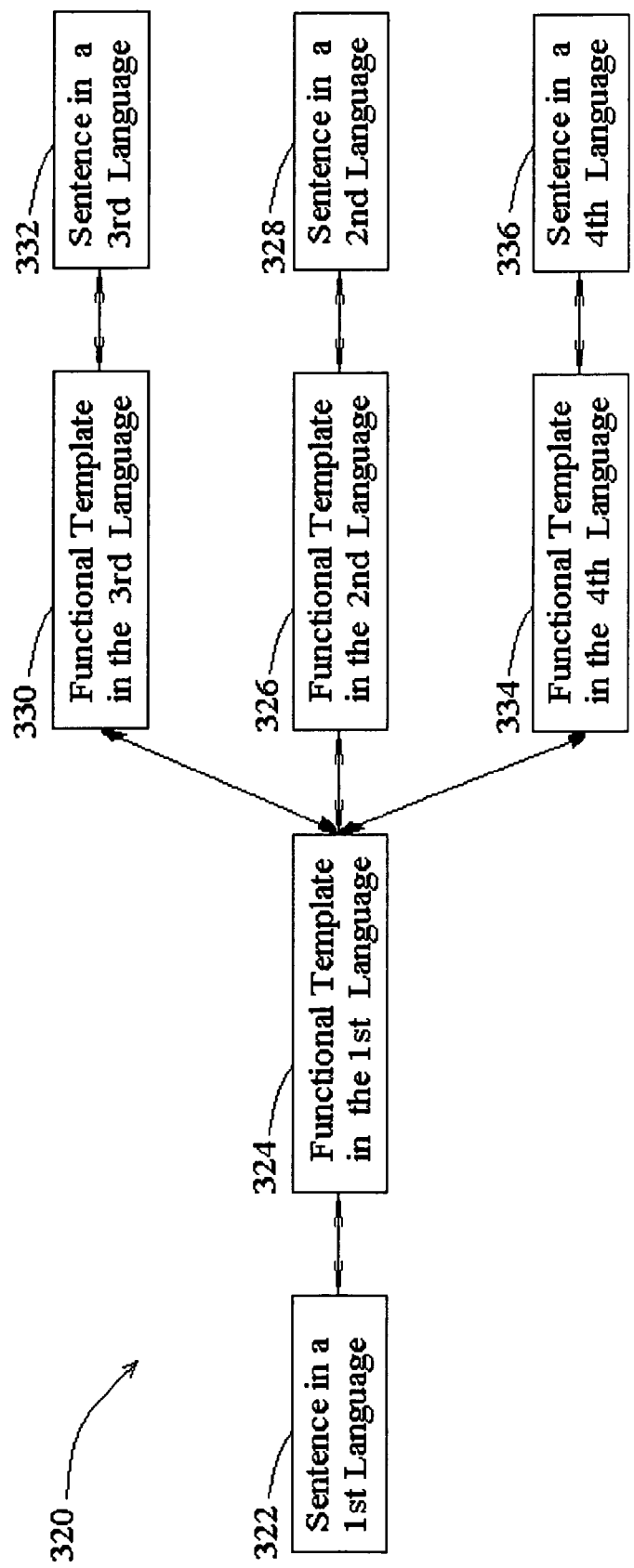
FIGS. 17A and 17B schematically illustrate, in flowchart forms, a method of performing automatic translation, utilizing functional templates, in accordance with the present invention.
Figure 17B:
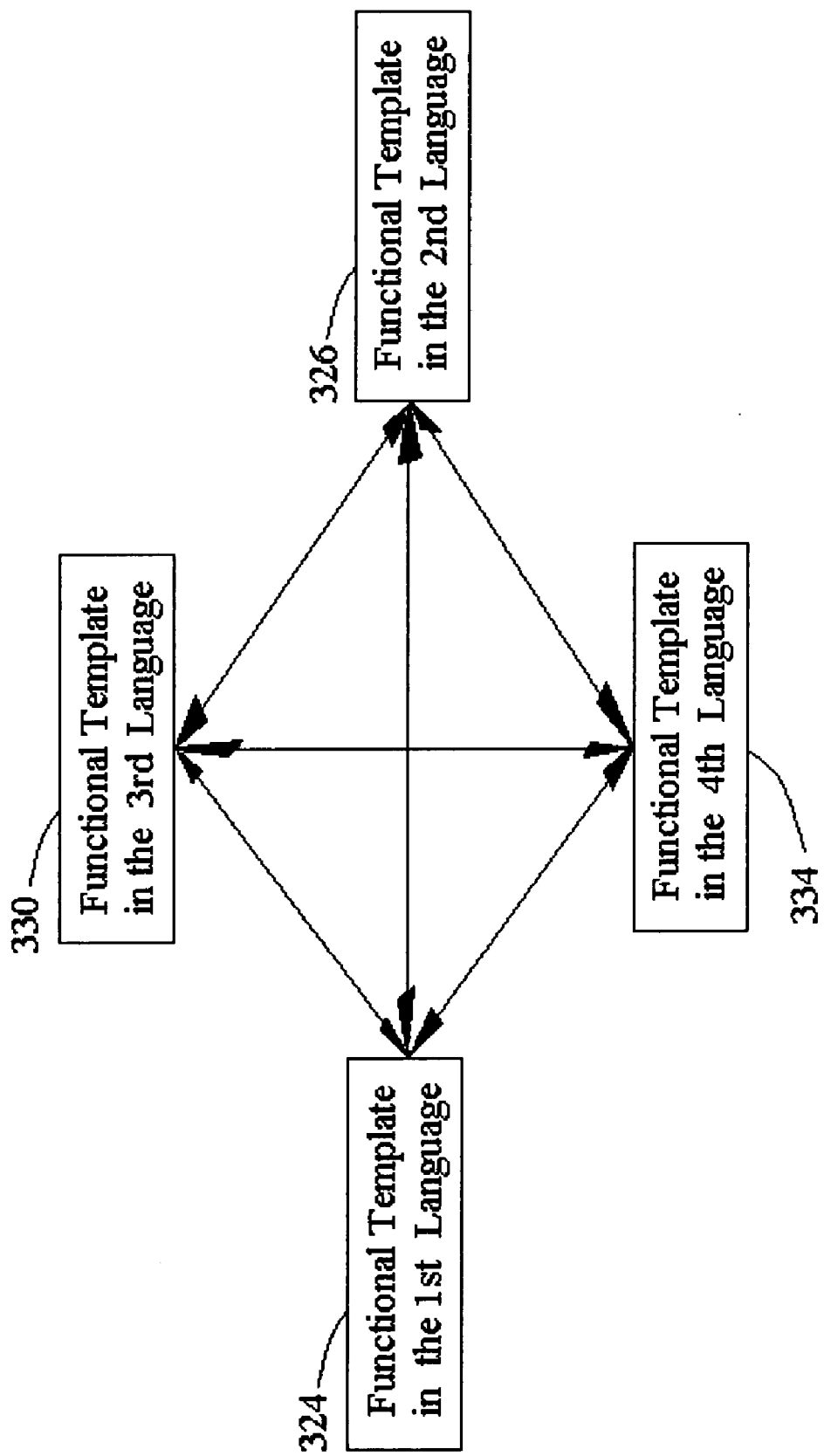

Reference is now made to FIGS. 17A and 17B, which schematically illustrate, in flowchart forms, a method 320 of performing automatic translation, utilizing the concept of functional templates, in accordance with the present invention. As has been pointed out, the functional templates of the different languages, for example, functional templates 444, 454, and 464 (FIGS. 15A-15C) may show differences in usage, specific to each language, and how these usages are converted from one language to another. For example, since a functional template 324 of a first language corresponds with a functional template 326 of a second language, as well as with a functional template 330 of the third language and with a functional template 334 of a fourth language, a correspondence between functional template 330 of the third language and functional template 334 of the fourth language is noted, without having to perform a translation between them, but indirectly, through their mutual correspondence with functional template 324 of first language.

The concept of obtaining correspondence between languages, indirectly, through their mutual correspondence with another language, is illustrated graphically, in FIG. 17B.

As has been pointed out, automatic translation is software whose input is a syntactically correct phrase, clause or sentence is a first language and whose output is a syntactically correct translation of the phrase, clause or sentence, to a second language, by combining translations of several dictionary entries, in a syntactically correct manner.

The main difficulty to the application of widespread automatic translation is that words tend to have multiple meanings, so the original document, in the first language, is ambiguous. The interactive automatic translation software hereinbelow, described in conjunction with FIGS. 18A-18D, offers several solutions.

Reference is now made to FIGS. 18A-18D, which schematically illustrate, in flowchart forms, interactive methods of translation, in accordance with the present invention.

Figure 18A:
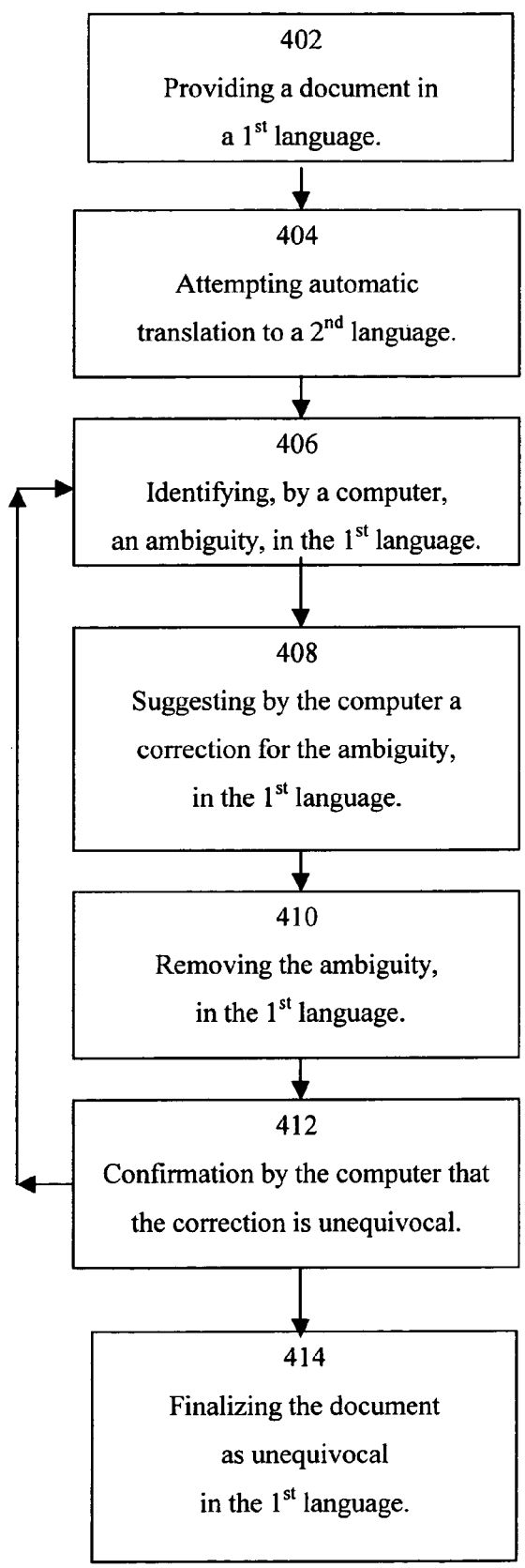
FIGS. 18A-18D schematically illustrate, in flowchart forms, interactive methods of translation, in accordance with the present invention.

FIG. 18A schematically illustrates an interactive method 400 of preparing automatic-translation viable documents, preferably by a person, in tandem with an interactive automatic translation program. In a sense, method 400 is analogous to the setting of a printing press, which may be time consuming and tedious. Yet it provides for many copies to be reproduced, quickly and automatically. Method 400 relates to the preparation of an original document in a first language, as an "automatic-translation viable document," so as to be unequivocal to automatic translation. Later, automatic translation to a plurality of languages may be performed, quickly, from this document.

It will be appreciated that the automatic-translation viable document may include hidden clues, which are not printed and are generally invisible to a reader but linked to the soft copy of the document.

Interactive method 400 may proceed as follows:

In a box 402, a document in a first language is provided. As an example, the sentence, "Please order these files," may be included in it.

In a box 404, automatic translation to a second language is attempted, preferably, in a stepwise manner, by grammatical units.

In a box 406, an ambiguity in the first language is identified by the automatic translation.

In a box 408, the ambiguity in the first language is referred to the person, for consultation, for example, with the following questions:

"Regarding: "Please order these files,"

1. Do you wish these files requested? If so, change to "Please order (hidden clue: request) these files,"

2. Do you wish these files put in order? If so, change to "Please order (hidden clue: put in order) these files,"

In a box 410, the person may accept the suggestion for hidden clues. Alternatively or additionally, the person may rephrase the sentence so as to read any one of the following: "Please order these files from the file room," "Please order these files alphabetically," "Please order, or arrange these files," or "Please put these files in order." Thus the correction may include a change of wording as well as an addition of adjectives, adverbs, adjective and adverbial phrases or clauses, and an addition of synonyms. Alternatively, it may include hidden clues, which may be invisible to a reader.

In a box 412, the automatic translation confirms that the ambiguity in the first language has been removed.

The steps in boxes 406-412 may be repeated until the whole document in the first language has been examined for ambiguities and corrected.

In a box 414, the document is finalized as an automatic-translation viable document in the first language.

It will be appreciated that the ambiguities may be identified by a contextual analysis rather than by the automatic translation software. However, in accordance with the preferred embodiment, the automatic translation software that is later used for the actual translation is used for pointing out the ambiguities, for consistency's sake.

It will be appreciated that this method is especially useful in the preparation of teaching material, to be used in association with automatic translation, for example, with stand-alone, hand-held, computerized scanning apparatus 10 of the present invention. However, in this case, preferably hidden clues will not be used. Alternatively, the hidden clues may be written in an ink, which is invisible to a person, but visible to a scanner.

Figure 18B:
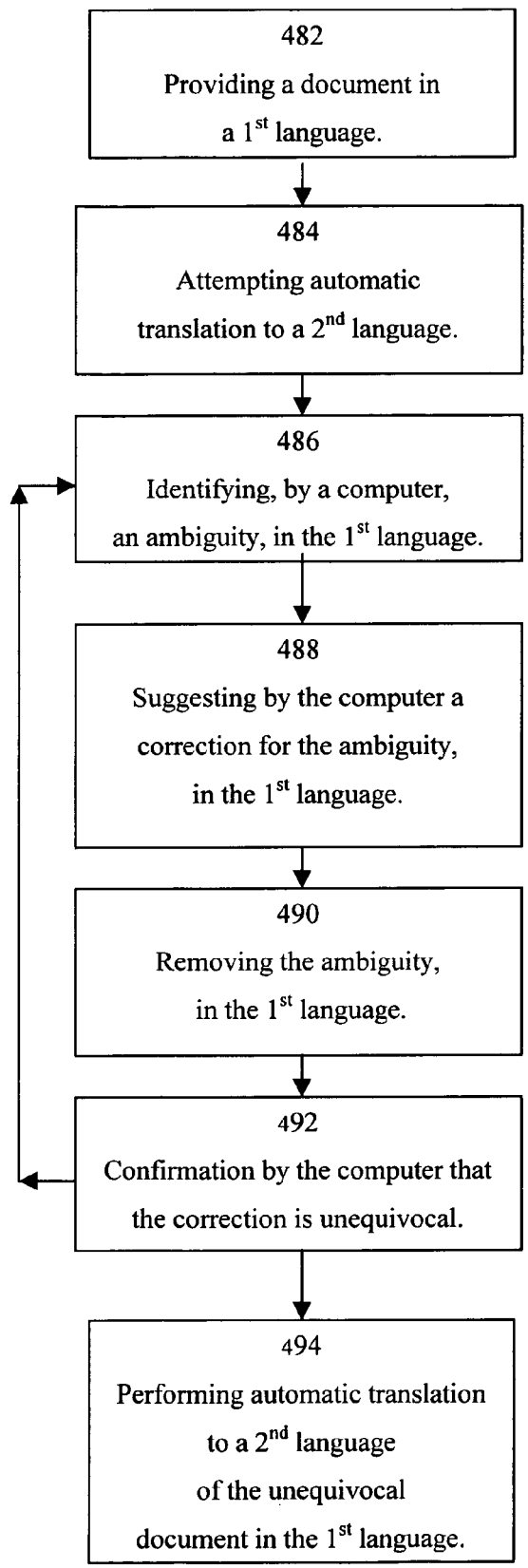

FIG. 18B schematically illustrates an interactive method 480 of translating a document, for example, by a person who is versed primarily in the first language, in tandem with an interactive automatic translation program.

Interactive method 480 may proceed as follows:

In a box 482, a document in a first language is provided.

In a box 484, automatic translation to a second language is attempted, preferably, in a stepwise manner, by grammatical units.

In a box 486, an ambiguity in the first language is identified by the automatic translation.

In a box 488, the ambiguity in the first language is referred to the person, for consultation.

In a box 490, the ambiguity in the first language is corrected by the person.

In a box 492, the automatic translation confirms that the ambiguity in the first language has been removed.

The steps in boxes 486-492 may be repeated until the whole document in the first language has been examined for ambiguities and corrected.

In a box 494, the automatic translation translates the unequivocal document in the first language to a second language.

It will be appreciated that the ambiguities may be identified by a contextual analysis rather than by the automatic translation software.

Figure 18C:
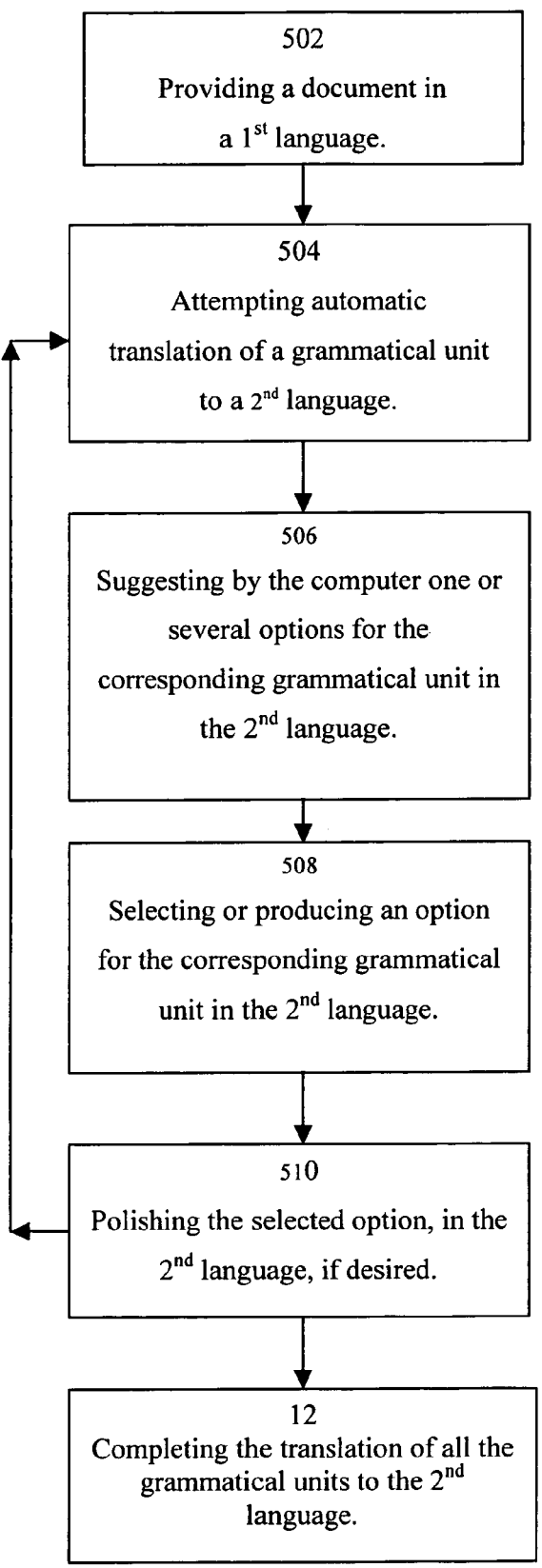

FIG. 18C schematically illustrates an interactive method 500 of translating a document, for example, by a person who is versed both in the first and second languages, but wishes to speed up his work, by using an interactive automatic translation program.

Interactive method 500 may proceed as follows:

In a box 502, a document in a first language is provided.

In a box 504, automatic translation is attempted, in a stepwise manner, by grammatical units.

In a box 506, the automatic translation suggests one or several options for a corresponding grammatical unit in the second language.

In a box 508, the person may accept one of the suggestions, or may produce his own translation.

In a box 510, the person may polish up the selection.

Steps 504-510 may be performed for each grammatical unit.

In a box 512, the complete document is translated.

Figure 18D:
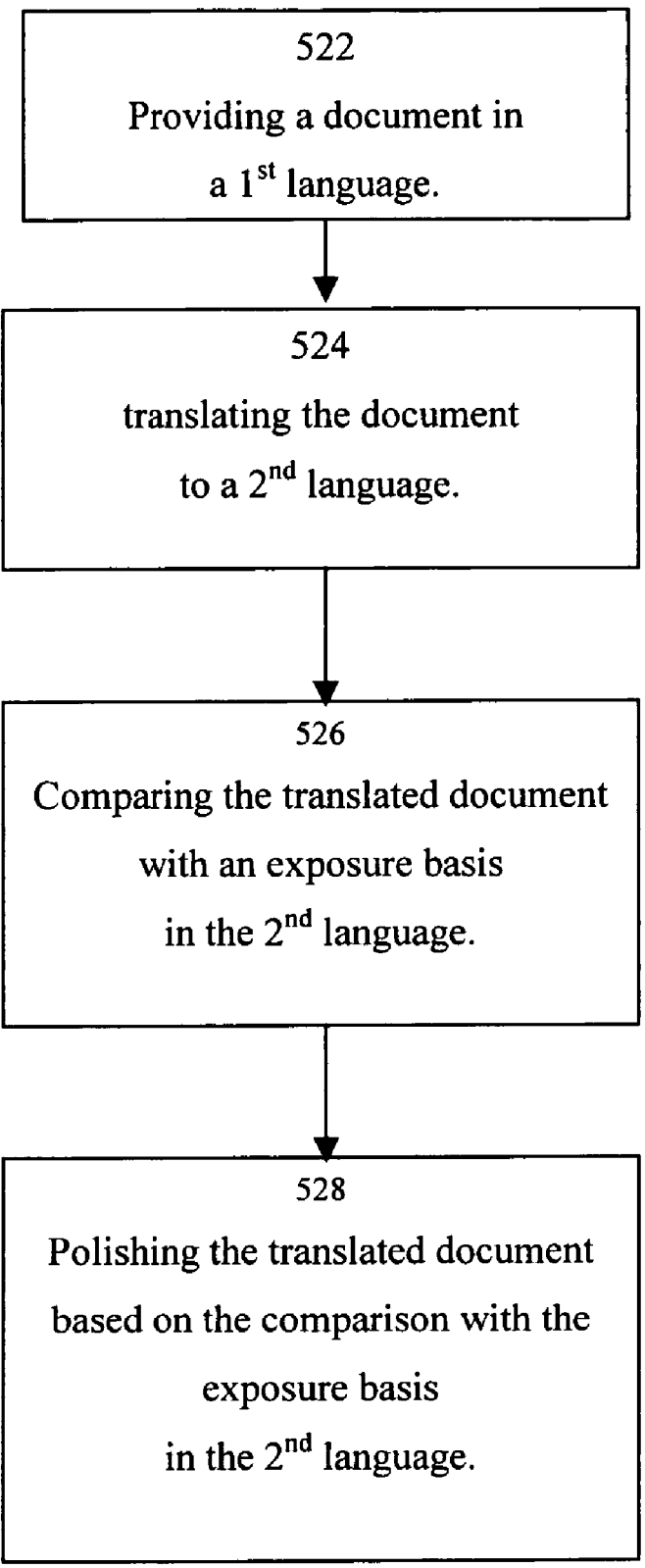

FIG. 18D schematically illustrates an interactive method 520 of translating a document, using an exposure basis, in the second language.

Interactive method 520 may proceed as follows:

In a box 522, a document in a first language is provided. The document may be an automatic-translation viable document, in the first language, or any other document.

In a box 524, translation to a second language is performed, manually or by automatic translation.

In a box 526 a comparison is made between the translated document, in the second language and the exposure basis in the second language.

In a box 528, the translated document, in the second language is polished, based on the comparison with the exposure basis.

It will be appreciated that polishing may include replacing translated words, phrases, clauses, and sentences, with those of substantially identical meanings, which appear to be more common. For example, if a document, which has been translated into English includes the term "science's fair," that term may be replaced with "science fair" by a comparison with exposure basis 440.

It will be appreciated that a method of proofreading on a contextual level may also be performed. Interactive proofreading software may be employed, to scan a document, in a stepwise manner, per grammatical unit, and rephrase each grammatical unit. Where the rephrasing is wrong, it may be due to an ambiguity in the language, or due to an error on the part of the writer, which he may then correct.

It is expected that during the life of this patent many relevant apparatus and methods will be developed and the scope of the present invention is intended to include all such new technologies a priori.

As used herein the term "about" refers to ±10%.

It is appreciated that certain features of the invention, which are, for clarity, described in the context of separate embodiments, may also be provided in combination in a single embodiment. Conversely, various features of the invention, which are, for brevity, described in tic context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed:

1. A stand-alone, hand-held, computerized scanning apparatus, which includes:
    a body, having a proximal end with respect to a portion of text, in a first language;
    a scanner, located within the body, substantially at the proximal end, adapted for scanning the portion of text, in the first language, wherein the portion of text is selected from the group consisting of at least one phrase, at least one clause, at least one sentence, at least two sentences, and a combination thereof;
    a computerized system, located within the body, in communication with the scanner, adapted for performing:
        OCR conversion of the scanned portion of text; and
        contextual analysis of phrases, clauses and sentences, in the first language; and
    a user-interactive feature, in communication with the computerized system, adapted for marking a dictionary entry embedded within a grammatical unit, the grammatical unit being selected from the group consisting of a phrase, a clause and a sentence, in the portion of text.

2. The apparatus of claim 1, and further including at least one output system, in communication with the computerized system, for presenting at least one definition for the dictionary entry, based on a contextual analysis of the grammatical unit.

3. The apparatus of claim 2, wherein the at least one definition includes at least one definition in accordance with the function of the dictionary entry, when embedded within the grammatical unit.

4. The apparatus of claim 2, wherein the at least one definition includes several definitions for the dictionary entry, ranked in accordance with their likelihood, when embedded in the grammatical unit, based on the contextual analysis.

5. The apparatus of claim 2, wherein the at least one definition includes at least one translation to a second language, for the dictionary entry, based on the contextual analysis of the grammatical unit.

6. The apparatus of claim 2, adapted for presenting additional definitions, not based on the contextual analysis, for general background knowledge, and further adapted for denoting the additional definitions as not based on the contextual analysis.

7. A stand-alone, hand-held, computerized scanning apparatus, which includes:
    a body, having a proximal end with respect to a portion of text, in a first language;
    a scanner, located within the body, substantially at the proximal end, adapted for scanning the portion of text, in the first language, wherein the portion of text is selected from the group consisting of at least one clause, at least one sentence, at least two sentences, and a combination thereof; and
    a computerized system, located within the body, in communication with the scanner, adapted for performing:
        OCR conversion of the scanned portion of text; and
        automatic translation of a grammatical unit, selected from the group consisting of at least one clause, at least one sentence, at least two sentences, and a combination thereof, to a second language.

8. The apparatus of claim 7, and further including at least one output system, in communication with the computerized system, for providing the automatic translation.

9. The apparatus of claim 7, wherein the automatic translation of the grammatical unit further includes at least two versions of automatic translation of the grammatical unit, for a user to choose from.

* * * * *